US012043733B2

(12) United States Patent
Wolan et al.

(10) Patent No.: US 12,043,733 B2
(45) Date of Patent: *Jul. 23, 2024

(54) COMPOSITIONS AND ARTICLES COMPRISING COMPLEXES OF 1-METHYLCYCLOPROPENE AND α-CYCLODEXTRIN

(71) Applicant: Fresh Inset S.A., Torun (PL)

(72) Inventors: Andrzej Wolan, Torun (PL); Mariusz Bosiak, Torun (PL); Marcin Pakulski, Przysiek (PL); Lucyna Czajkowska, Kwidzyn (PL); Katarzyna Anna Guranowska, Grebocin (PL); Roksana Katarzyna Radlowska, Bydgoszcz (PL)

(73) Assignee: Fresh Inset S.A., Torun (PL)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,599

(22) Filed: Jan. 3, 2022

(65) Prior Publication Data

US 2022/0372251 A1 Nov. 24, 2022

Related U.S. Application Data

(63) Continuation of application No. 16/870,333, filed on May 8, 2020, now Pat. No. 11,248,109, which is a continuation of application No. 16/456,128, filed on Jun. 28, 2019, now Pat. No. 10,647,834, which is a continuation of application No. PCT/EP2019/060816, filed on Apr. 26, 2019.

(30) Foreign Application Priority Data

Apr. 27, 2018 (PL) .......................... 425413
Apr. 27, 2018 (PL) .......................... 425414
Apr. 27, 2018 (PL) .......................... 425415

(51) Int. Cl.
| | |
|---|---|
| *C08L 5/16* | (2006.01) |
| *A01N 25/22* | (2006.01) |
| *C08L 39/06* | (2006.01) |
| *C09J 7/21* | (2018.01) |
| *C09J 7/40* | (2018.01) |
| *C09J 9/00* | (2006.01) |
| *C09J 11/06* | (2006.01) |

(52) U.S. Cl.
CPC .............. *C08L 5/16* (2013.01); *A01N 25/22* (2013.01); *C08L 39/06* (2013.01); *C09J 7/21* (2018.01); *C09J 7/401* (2018.01); *C09J 9/005* (2013.01); *C09J 11/06* (2013.01); *C09J 2203/334* (2013.01); *C09J 2400/283* (2013.01); *C09J 2405/005* (2013.01)

(58) Field of Classification Search
CPC ........ C08F 226/08; B65D 81/24; A01N 25/22
See application file for complete search history.

(56) References Cited

U.S. PATENT DOCUMENTS

| | | |
|---|---|---|
| 5,518,988 A | 5/1996 | Sisler et al. |
| 5,547,693 A | 8/1996 | Krochta et al. |
| 6,017,849 A | 1/2000 | Daly et al. |
| 6,770,600 B1 | 8/2004 | Lamola et al. |
| 8,822,382 B2 | 9/2014 | Mir |
| 9,074,106 B2 | 7/2015 | Wood et al. |
| 9,320,288 B2 | 4/2016 | Wood et al. |
| 9,353,282 B2 | 5/2016 | Wood et al. |
| 9,394,216 B2 | 7/2016 | Mir |
| 9,421,793 B2 | 8/2016 | Wood et al. |
| 9,642,356 B2 | 5/2017 | Wood et al. |
| 9,675,069 B2 | 6/2017 | Wood et al. |
| 9,713,329 B2 | 7/2017 | Wood et al. |
| 10,182,567 B2 | 1/2019 | Wood et al. |
| 10,212,931 B2 | 2/2019 | Wood et al. |
| 10,376,472 B2 | 8/2019 | Wood et al. |
| 10,647,834 B2 | 5/2020 | Wolan et al. |
| 11,248,109 B2 | 2/2022 | Wolan et al. |
| 11,730,166 B2 | 8/2023 | Wolan et al. |
| 2002/0043730 A1 | 4/2002 | Chong et al. |
| 2002/0107295 A1 | 8/2002 | Edmundson et al. |
| 2005/0069533 A1 | 3/2005 | Millan et al. |
| 2005/0074490 A1 | 4/2005 | Lin et al. |
| 2005/0260907 A1 | 11/2005 | Chang et al. |
| 2007/0275101 A1 | 11/2007 | Lu et al. |
| 2011/0143004 A1 | 6/2011 | Wood et al. |
| 2012/0258220 A1 | 10/2012 | Jacobson |
| 2013/0029058 A1 | 1/2013 | Wood et al. |
| 2013/0251926 A1 | 9/2013 | Wood et al. |

(Continued)

FOREIGN PATENT DOCUMENTS

| | | |
|---|---|---|
| CN | 1412227 | 4/2003 |
| CN | 1759700 | 4/2006 |

(Continued)

OTHER PUBLICATIONS

[No Author Listed]. " FAO Specifications and Evaluations for Agricultural Pesticides 1-Methylcyclopropene," Food and Agriculture Organization of the United Nations, Jan. 2010, 30 pages.
Blankenship & Dole, "1-Methylcyclopropene: a review," Postharv Biol. Technol., 2003, 28(1):1- 25.
Chen et al., "Delivery Formulations for Modifying Ethylene Response of Fresh Produce," Dissertation for the degree of Doctor of Philosophy, The State University of New Jersey, Graduate Program in Food Science, Oct. 2015, 126 pages.
Chopra et al., "Metal-organic frameworks have utility in adsorption and release of ethylene and 1-methylcyclopropene in fresh produce packaging," Postharvest Biol. Tech., 2017, 130:48-55.

(Continued)

*Primary Examiner* — Kyle A Purdy
(74) *Attorney, Agent, or Firm* — Fish & Richardson P.C.

(57) ABSTRACT

Compositions comprising complexes of 1-methylcyclopropene and α-cyclodextrin, and articles including the composition, are provided. Methods for using the compositions and articles in delaying the maturation of fruits, vegetables, and plants are also provided.

20 Claims, 44 Drawing Sheets

(56) References Cited

U.S. PATENT DOCUMENTS

| | | | |
|---|---|---|---|
| 2013/0280388 | A1 | 10/2013 | Ekanayake et al. |
| 2014/0017134 | A1 | 1/2014 | Yoo et al. |
| 2014/0080712 | A1 | 3/2014 | Lao et al. |
| 2014/0094369 | A1 | 4/2014 | Baier et al. |
| 2014/0154370 | A1 | 6/2014 | Wood |
| 2015/0018430 | A1 | 1/2015 | Williamson et al. |
| 2015/0366189 | A1 | 12/2015 | Becker |
| 2017/0150716 | A1 | 6/2017 | Chang et al. |
| 2018/0064106 | A1 | 3/2018 | Coles et al. |
| 2019/0330451 | A1 | 10/2019 | Wolan et al. |
| 2020/0277470 | A1 | 9/2020 | Wolan et al. |
| 2021/0235692 | A1 | 8/2021 | Wolan et al. |
| 2021/0332158 | A1 | 10/2021 | Wood et al. |

FOREIGN PATENT DOCUMENTS

| | | |
|---|---|---|
| CN | 101636446 | 1/2010 |
| CN | 101715760 | 6/2010 |
| CN | 102532611 | 7/2012 |
| CN | 102726377 | 10/2012 |
| CN | 103459356 | 12/2013 |
| CN | 104086574 | 10/2014 |
| CN | 104341257 | 2/2015 |
| CN | 105357962 | 2/2016 |
| CN | 105437676 | 3/2016 |
| CN | 106928015 | 7/2017 |
| CN | 108184989 | 6/2018 |
| CN | 108770845 | 11/2018 |
| EP | 1192859 | 4/2002 |
| EP | 1236397 | 9/2002 |
| EP | 1237411 | 9/2002 |
| EP | 1304035 | 4/2003 |
| EP | 1340425 | 9/2003 |
| EP | 1593306 | 11/2005 |
| EP | 1597968 | 11/2005 |
| EP | 2109641 | 10/2009 |
| EP | 3180981 | 6/2017 |
| JP | 2012-219096 | 11/2012 |
| JP | 2016-538003 | 12/2016 |
| JP | 2017-532367 | 11/2017 |
| KR | 2010-0004516 | 1/2010 |
| MX | 2015/003420 | 11/2015 |
| MX | 2015/014899 | 5/2016 |
| WO | WO 2001/43548 | 6/2001 |
| WO | WO 2002/46290 | 6/2002 |
| WO | WO 2003/075892 | 9/2003 |
| WO | WO 2004/101668 | 11/2004 |
| WO | WO 2007/103336 | 9/2007 |
| WO | WO 2008/089140 | 7/2008 |
| WO | WO 2011/081877 | 7/2011 |
| WO | WO 2011/103793 | 9/2011 |
| WO | WO 2012/134539 | 10/2012 |
| WO | WO 2014/040288 | 3/2014 |
| WO | WO 2014/113375 | 7/2014 |
| WO | WO 2014/172899 | 10/2014 |
| WO | WO 2014/172900 | 10/2014 |
| WO | WO 2016/023297 | 2/2016 |
| WO | WO 2017/039960 | 3/2017 |
| WO | WO 2017/143311 | 8/2017 |
| WO | WO 2019/133076 | 7/2019 |

OTHER PUBLICATIONS

Communication in European Appln. No. 19724746.3, dated Sep. 1, 2021, 13 pages.
De Martino et al, "1-MCP controls ripening induced by impact injury on apricots by affecting SOD and POX activities," Postharvest Biology and Technology, 2006, 39:38-47.
Fisher et al., "Synthesis of 1-Methylcyclopropene," J. Org. Chem., Jun. 1965, 30(6):2089-90.
Gamrasni et al, "1-Methylcyclopropene (1-MCP) application to Spadona pears at different stages of ripening to maximize fruit quality after storage," Postharvest Biology and Technology, 2010, 58:104-112.
Hassan & Mahfouz, "Effect of 1-methylcyclopropene (1-MCP) treatment on sweet basil leaf senescence and ethylene production during shelf-life," Postharvest Biology and Technology, 2010, 55:61-65.
Huber et al, "Use of 1-methylcyclopropene (1-MCP) on tomato and avocado fruits for growth and quality retention," University of Florida, IFAS Extension, 2003, HS914, 3 pages.
Huber, "Suppression of Ethylene Responses Through Application of 1-Methylcyclopropene: A Powerful Tool for Elucidating Ripening and Senescence Mechanisms in Climacteric and Nonclimacteric Fruits and Vegetables," HortScience, Feb. 2008, 43(1):106-111.
Kasm et al, "The effect of packaging after 1-MCP treatment on color changes and chlorophyll degradation of broccoli (*Brassica oleracea* var. *Italica* cv. Monopoly,)" Journal of Food, Agriculture & Environment, 2007, 5(3&4):48-51.
Keller et al, "Ethylene Removal and Fresh Product Storage: A Challenge at the Frontiers of Chemistry. Toward an Approach by Photocatalytic Oxidation," Chem. Rev., 2013, 113:5029-5070.
Liou & Miller, "Factors affecting ethylene sensitivity and 1-MCP response in tulip bulbs," Postharvest Biology and Technology, 2011, 59:238-244.
Magid et al., "An Efficient and Convenient Synthesis of 1-Methylcyclopropene," J. Org. Chem., May 1971, 36(9):1320-1.
McArtney et al, "Preharvest 1-methylcyclopropene delays fruit maturity and reduces softening and superficial scald of apples during long-term storage," 2008, HortScience, 43(2):366-371.
Menniti et al, "Responses of 1-MCP application in plums under air and controlled atmospheres," Postharvest Biology and Technology, 2006, 39:243-246.
Neoh et al, "Kinetics of molecular encapsulation of 1-methylcyclopropene into α-cyclodextrin," J. Agric. Food Chem., 2007, 55(26):11020-11026.
PCT International Preliminary Report on Patentability in International Appln. No. PCT/EP2019/060816, dated Oct. 27, 2020, 9 pages.
PCT International Search Report and Written Opinion in International Appln. No. PCT/EP2019/060816, dated Jul. 30, 2019, 14 pages.
PCT International Search Report and Written Opinion in International Appln. No. PCT/IB2021/050746 dated Apr. 19, 2021, 15 pages.
Permana et al., "Characterization of 1-MCP Gas from Synthesis of Various Ratios of Lithium Diisopropylamide (LDA) and 3-Chloro-2-Methylpropene (CMP)," II Asia Pacific Symposium on Postharvest Research Education and Extension, Sep. 2012, 351-6.
Saltveit, "Effect of ethylene on quality of fresh fruits and vegetables," Postharv. Biol. Technol., 1999, 15:279-292.
Sisler & Serek, "Compounds interacting with the ethylene receptor in plants," Plant Biol., 2003, 5:473-480.
Sislert and Yang, "Anti-Ethylene Effects of CIS-2-Butene and Cyclic Olefins" Phytochemistry, 1984, 23(12):2765-8.
Watkins, "Postharvest effects on the quality of horticultural products: using 1-MCP to understand the effects of ethylene on ripening and senescence processes," Acta Hort., 2008, 768:19 -32.
Watkins, "The effect of 1-MCP on the development of physiological storage disorders in horticultural crops," Stewart Postharvest Rev., 2007, 2:11, 6 pages.
Watkins, "The use of 1-methylcyclopropene (1-MCP) on fruits and vegetables," Biotechnol. Adv., Jul.-Aug. 2006, 24(4):389-409.
Zhang et al., "Encapsulation of the Ethylene Inhibitor 1-Methylcyclopropene by Cucurbit[6]uril," J. Agric. Food Chem., 2011, 59:10539-45.
Neoh et al., "Dissociation characteristic of the inclusion complex of cyclomaltohexaose (α-cyclodextrin) with 1 methylcyclopropene in response to stepwise rising relative humidity," Carbohydr. Res., Sep. 2010, 345(14):2085-2089.
Communication in European Appln. No. 19724746.3, dated Feb. 17, 2023, 9 pages.

(56) References Cited

OTHER PUBLICATIONS

Nevicolor.it [online], "DuPont Packaging & Industrial Polymers, Elvax 250," Aug. 2010, retrieved on Mar. 8, 2023, retrieved from URL <https://www.nevicolor.it/produkte/polymer-suchen/dupont/elvax/allegati/elvax-250.pdf>, 3 pages.

COMPOSITIONS AND ARTICLES COMPRISING COMPLEXES OF 1-METHYLCYCLOPROPENE AND α-CYCLODEXTRIN

CROSS-REFERENCE TO RELATED APPLICATIONS

This application is a continuation of U.S. patent application Ser. No. 16/870,333, filed on May 8, 2020, which is a continuation of U.S. patent application Ser. No. 16/456,128, filed on Jun. 28, 2019, which is a continuation of PCT/EP2019/060816, filed on Apr. 26, 2019, which claims priority to Polish Patent Application No. P.425413, filed on 27 Apr. 2018, to Polish Patent Application No. P.425414, filed on 27 Apr. 2018, and to Polish Patent Application No. P.425415, filed on 27 Apr. 2018, all of which are incorporated by reference in their entireties.

TECHNICAL FIELD

This invention relates to compositions comprising complexes of 1-methylcyclopropene and α-cyclodextrin, and articles (such as labels, sticks, and packaging) that include these complexes for use in delaying the maturation of, e.g., fruits, vegetables, and plants.

BACKGROUND

Ethylene affects a wide range of physiological processes in plants, including fruits, vegetables, and flowers, such as drooping, aging and maturation, chlorophyll loss, softening, physiological disorders, germination, isocoumarin synthesis, lignification, discoloration (browning), decomposition, and stimulation of defense systems. When storing plant products, it is essential to control the influence of ethylene to prolong the durability of these products, delay their maturation, browning or aging.

One of the methods used is to inhibit the action of ethylene by blocking ethylene receptors in plant cells. 1-methylcyclopropene (1-MCP) is a gas that has been used for this purpose. 1-MCP, which may be provided in the form of a complex with α-cyclodextrin, is released upon exposure to water, e.g., in the form of humidity.

SUMMARY

In a first aspect, there is described a composition that includes: (a) a complex of 1-methylcyclopropene and α-cyclodextrin and (b) a polymer binder selected from the group consisting of polyvinylpyrollidone and copolymers thereof, polyvinyl alcohol and copolymers thereof, polyvinyl acetate copolymers, and combinations thereof. In some embodiments, the ratio of polymer binder to complex on a weight to weight basis ranges from about 0.5:1 to about 3:1. In some embodiments, the ratio of polymer binder to complex on a weight to weight basis ranges from about 0.5:1 to about 4:1. The composition is capable of releasing the 1-methylcyclopropene in the form of a gas when exposed to moisture and has a release profile characterized in that when exposed at room temperature in a sealed vessel to conditions of 85% relative humidity, the composition releases substantially no 1-methylcyclopropene after a time period of at least 1 hour after exposure and thereafter continuously releases 1-methylcyclopropene for at least 5 hours after exposure.

In some embodiments, the ratio of polymer binder to complex on a weight to weight basis is about 1:1. In some embodiments, the polymer binder has a molecular weight ranging from about 5,000 to about 15,000 (e.g., about 10,000). In some embodiments, the 1-methylcyclopropene is present in the composition in an amount of from about 0.825 wt % to about 2.2 wt %. In some embodiments, the 1-methylcyclopropene is present in the composition in an amount of from about 0.66 wt % to about 2.2 wt %.

In some embodiments, the composition includes a hygroscopic agent, e.g., a hygroscopic agent selected from the group consisting of glycerol, glucose, and combinations thereof. In some embodiments, the composition includes a humidity-indicating dye. Examples of suitable humidity-indicating dyes include quinolone yellow, curcumin (alone or in combination with sodium hydrogen carbonate, tetra-butylammonium hydroxide (TBAOH), or patent blue), patent blue, hydrochromic ink, thymol blue (alone or in combination with TBAOH), bromothymol blue (alone or in combination with TBAOH or bromochlorophenol blue), indigo carmine (alone or in combination with TBAOH), bromochlorophenol blue (alone or in combination with TBAOH or acetic acid), and Reichardt's dye (alone or in combination with TBAOH).

In some embodiments, the composition has a release profile characterized in that when exposed at room temperature in a sealed vessel to conditions of 85% relative humidity, the composition releases substantially no 1-methylcyclopropene after 2 hours or after 3 hours. In some embodiments, the composition has a release profile characterized in that when exposed at room temperature in a sealed vessel to conditions of 85% relative humidity, the composition releases substantially no 1-methylcyclopropene after a time period of at least 1 hour or at least 3 hours after exposure and thereafter continuously releases 1-methylcyclopropene for at least 24 hours after exposure. Preferably, the compositions do not release 1-methylcyclopropene when the relative humidity at room temperature is less than 60%.

The composition may be in the form of a stick that can be manually applied to a surface of a substrate. Alternatively, the composition may be included in an adhesive label where the label includes a substrate having a first surface and a second surface in which the composition is provided on the first surface and an adhesive provided on the second surface. Example of suitable substrates include paper, cardboard, and synthetic substrates.

Where the composition is designed for use in a label, the composition may be prepared from a precursor composition that includes the complex, polymer binder, and a solvent, e.g., propanol, especially 2-propanol. Preferably, the polymer, solvent, and 1-methylcyclopropene complex with α-cyclodextrin are combined in a ratio of 1:2:1, 2:2:1, 1:2:1. Preferably, the precursor composition contains 20-45% polymer, 40-55% solvent and 15-40% complex of 1-methylcyclopropene with alpha-cyclodextrin. Preferably, the precursor composition comprises glycerol, e.g, 5-20% glycerol. The precursor composition may also include plasticizers and/or compounds that increase the humidity of the active layer.

In some embodiments, the labels are prepared by a) preparing a paste from the composition ingredients as defined above, b) applying a screen layer of paste to the substrate (e.g., adhesive paper layer) with a screen printing technique, and c) drying the resulting layer structure to remove solvent. In some embodiments, the thickness of the 1-MCP-containing layer in the label can vary depending on the screen print mesh used. As the mesh size number increases, less composition containing 1-MCP is applied. Thus, thickness of the 1-MCP-containing layer in the label can decrease with increasing mesh size number. A wide range of mesh sizes can be used to produce varying thicknesses of the 1-MCP-containing layer in the label. Preferably, screen print mesh sizes 32 T, 43 T, 47 T, 48 T, 64 T, and 68 T are used.

The labels may be used in a method for prolonging plant life and delaying the ripening process of fruit and vegetables comprising placing a label as defined above inside a package for storing plant products and exposing it on humidity conditions produced in the package by plant products.

The label, due to its composition and construction, releases 1-MCP gas under the influence of moisture generated in the natural process of fruit and vegetable breathing. Under normal conditions of humidity, e.g., up to 60% or 75% relative humidity, the label is stable. Above this level, there is a gradual release of 1-MCP gas from the surface of the label after a period of time. The polymer binder (e.g., the PVP polymer) acts as a binding agent and at the same time absorbs ambient moisture. One advantage of this type of binder for 1-MCP is the ease of its use, versatility, the flexibility of the form, and the possibility of straightforward modification to the customer's needs.

The layered design of the label sticker can be modified over an extensive range. Depending on the time required for the release of 1-MCP and relative humidity, the label can be covered with additional functional layers (barrier polymers, hydrophilic, hydrophobic, hygroscopic additives, etc.). The size of the label can also vary based on the size of the package and the weight of fruit/vegetables in this package, and the necessary concentration of 1-MCP to be achieved.

Preferably, to assist the end user, the label includes an indicator to communicate to the end user that 1-MCP has been released and has reached an effective concentration. This can be achieved by adding a moisture indicator function to the label in the form of an appearing figure or a colored bar. The attainment of at least 85% humidity, which is indicated on the label, is synonymous with the release of 1-MCP.

The compositions have a viscosity, density, and cohesion that enable them to be applied to substrate surfaces, e.g., by screen printing to obtain an active layer of appropriate and reproducible thickness. They prolong the durability of fruits, vegetables, ornamental plants, etc., because they release gaseous 1-methylcyclopropene after reaching the appropriate level of ambient relative humidity at a given temperature (such as 85% at room temperature) or absolute humidity denoting the water content in g/m$^3$.

As noted above, the composition may be provided in the form of a stick for application to a surface (e.g., by spreading manually). To form the stick, the 1-methylcyclopropene/α-cyclodextrin complex is combined with a multicomponent mixture comprising polymers, waxes, paraffin, mono- and polyhydric alcohols, dyes, and/or excipients that are molded into a stick. The stick forms a soft substance in the shape of an a rod that, in turn, is embedded in a case that allows pulling out, for self-application outside or inside packages for storing fruit, vegetables or flowers (FIG. 34).

In some embodiments, the stick includes a molded mass contains 5-50 wt. % 1-methylcyclopropene/α-cyclodextrin complex, 2-45 wt. % polymer binder (e.g., polyvinylpyrrolidone (PVP)), and a casing in which the column is embedded. The mass may further include polymers, waxes, paraffin, mono- and polyhydric alcohols, dyes (e.g., cochineal red), and auxiliary components. Specific examples include coconut oil, SE-PF emulsifier, beeswax, stearic acid, candelilla wax, glycerol, and isopropyl alcohol. In some embodiments, the mass includes components selected from 0.5 wt. % dyes, 49.5 wt. % isopropyl alcohol, 53 wt. % coconut oil, 20 wt. % SE-PF emulsifier, 7.5-24 wt. % beeswax, 10 wt. % stearic acid, 7.5-24 wt. % candelilla wax, and/or 15-30 wt. % glycerin.

In one embodiment, the components of the mass constitute 45 wt. % polyvinylpyrrolidone (PVP), 5 wt. % 1-methylcyclopropene/α-cyclodextrin complex, 0.5 wt. % cochineal red, and 49.5 wt. % isopropyl alcohol.

In one embodiment, the components of the mass constitute 53 wt. % coconut oil, 20 wt. % SE-PF emulsifier, 10 wt. % stearic acid, 9.5 wt. % beeswax, 0.5 wt. % cochineal red, 2 wt. % polyvinylpyrrolidone (PVP), and 5 wt. % 1-methylcyclopropene/α-cyclodextrin complex.

In one embodiment, the components of the mass constitute 50 wt. % 1-methylcyclopropene/α-cyclodextrin complex, 24 wt. % beeswax, 24 wt. % candelilla wax, and 2 wt. % polyvinylpyrrolidone (PVP).

In one embodiment, the components of the mass constitute 30 wt. % 1-methylcyclopropene/α-cyclodextrin complex, 20 wt. % beeswax, 20 wt. % candelilla wax, and 30 wt. % polyvinylpyrrolidone (PVP).

In one embodiment, the components of the mass constitute 20 wt. % beeswax, 20 wt. % candelilla wax, 30 wt. % 1-methyl-cyclopropene/α-cyclodextrin complex, and 30 wt. % polyvinylpyrrolidone (PVP).

In one embodiment, the components of the mass constitute 35 wt. % 1-methylcyclopropene/α-cyclodextrin complex, 30 wt. % glycerol, and 35 wt. % polyvinylpyrrolidone (PVP).

In one embodiment, the components of the mass constitute 7.5 wt. % beeswax, 7.5 wt. % candelilla wax, 15 wt. % glycerol, 30 wt. % 1-methylcyclopropene/α-cyclodextrin complex, and 30% wt. polyvinylpyrrolidone (PVP).

The stick may be used to apply the composition to packaging in the form of paper, cardboard, or foil.

Use of the stick inhibits the process induced by ethylene, thus delaying the maturation and aging of plant products, by spreading the stick mass defined above on a material for packaging, storing a plant product from the inside of the package in which the plant product is found, and closing the packaging. 1-MCP release occurs after at least one hour when the relative humidity within the packaging reaches about 85%.

In a second aspect, there is described a composite mixture comprising a complex of 1-methylcyclopropene with α-cyclodextrin and copolymers of ethylene and vinyl acetate characterized by a melting point of 47-100° C., mixed in a weight ratio of 1:3. Examples of ethylene vinyl acetate copolymers are ethylene vinyl acetate copolymers have a vinyl acetate content of 17% to 41%, ethylene and vinyl acetate modified maleic anhydride, ethylene vinyl acetate copolymer modified with acrylic acid, and ethylene vinyl acetate copolymer with acetate content from 7.5% to 40%.

Also described is a granulate for an active layer of a PET composite film comprising the composite mixture described above.

Also described is a PET polyester composite film comprising in the active layer a granulate as described above. In some embodiments, the granulate content in the active layer is 0.1-5 wt %, e.g., 1 wt %.

In some embodiments, the PET film includes at least two active layers and at least one support layer, and is present in the ABA format where A is the active layer containing the 1-MCP/α-cyclodextrin complex and B is the carrier layer containing polyethylene. The active layer may be placed between the support layers.

In some embodiments, the active layer is 10% to 30% of the thickness of the composite film, and the support layer is 70-90%. The total thickness of the film may be 0.1-2 mm.

Also described is a process for preparing a PET composite film comprising a 1-methylcyclopropene complex with α-cyclodextrin that includes: (a) mixing the 1-methylcyclopropene/α-cyclodextrin complex with a copolymer of ethylene and vinyl acetate; (b) extruding the mixture obtained in step (a) to form a composite; (c) cooling and mechanically granuate the composite to form granules; (d) mixing the granules obtained in step (c) with carrier polymer granules to form a granule mixture; and e) co-extruding the granule mixture obtained in step (d) at 230° C. to 275° C., preferably 230 to 260° C., to form the composite film.

In some embodiments, the 1-methylcyclopropene/α-cyclodextrin complex is mixed with a 1:3 copolymer of ethylene and vinyl acetate in a weight ratio of 1:3. Examples of suitable ethylene vinyl acetate copolymers are described above.

In some embodiments, the extrusion in step (b) is carried out at 80° C.

In some embodiments, the granulate obtained in step (c) is mixed with the carrier polymer granules in step (d) in a weight ratio of A:B from 1:9 to 1:2.33.

In some embodiments, in step (e), a composite film is co-extruded in a three-layer system ABA, where layer A forms an upper layer in contact with layer B, and layer A forms a bottom layer in contact with layer B, wherein layer A is a layer obtained from the granulate obtained in step (c), and the layer B is a carrier polymer.

In some embodiments, the co-extrusion process is carried out with a single-screw or twin-screw extruder.

The PET polyester composite film may be used to manufacture of fruit and vegetable storage packaging, e.g., thermoformable packaging.

The mixture of 1-methylcyclopropene/α-cyclodextrin complex with polymers that are characterized by a high melt flow index and compatibility with polyester polymers (e.g, polyethylene terephthalate) makes it possible to incorporate the granulate as an additive to the outer layer in an extrusion process of PET film in ABA format, where A is a layer comprising a 1-MCP/α-cyclodextrin complex, hereinafter referred to as an active layer (FIG. 39). The granulate is obtained by melting and mixing the ingredients, followed by extrusion, cooling, and granulation.

In some embodiments, films have been prepared in which 1-MCP modified polyethylene is used as the active layer and placed between polyethylene layers or as a binder of two polyethylene films, where the polyethylene films are derivatives of high melt flow and low melting/softening/molding polyethylene. Specifically, a granulate comprising a 1-MCP/α-cyclodextrin complex and an ethylene vinyl acetate copolymer (for example Evatane (Arkema), Elvax (Dupont), Bynel (Dupont) having a melting point in the range of 47-100° C. have been prepared. The granules prepared in this way are used as a 1% addition to the outer layer of PET film extruded in the ABA system at a temperature of 230-260° C. and even up to 275° C. The co-extrusion process is carried out using an extruder. The addition of the granulate is in the range of 0.1-5% by weight in the outer layer, which is from 10% to 30% of the thickness of the extruded film. The thickness of the film is 0.1-2 mm.

The resulting PET co-extruded films release 1-MCP under the influence of moisture. Due to the natural hygroscopicity of PET, it is not necessary to include an additive that causes water absorption. It is also possible to obtain a PET film containing 1-MCP in a one-stage extrusion process, rather than a multistage lamination process, which is much more technologically complicated. Furthermore, the method allows the production of films of different thickness, as well as 1-MCP content only in the outer layer. The method also allows the production of packages by thermoforming from the obtained film (e.g., shell-type cloths) for storing fruit, vegetables, and flowers. Active 1-MCP is released under the influence of moisture generated in the natural breathing process of fruits and vegetables after they have been placed in a container.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
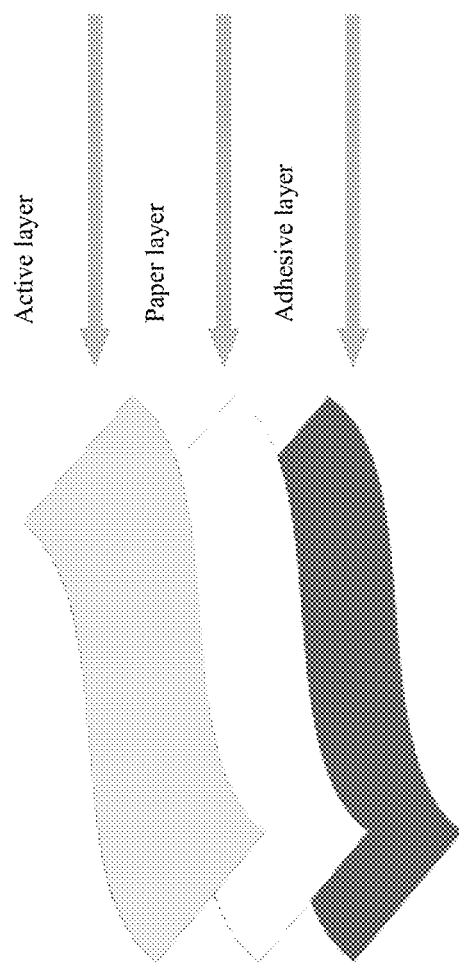
FIG. 1. is an exploded perspective view of a functional sticker with an active layer containing 1-MCP.
Figure 2:
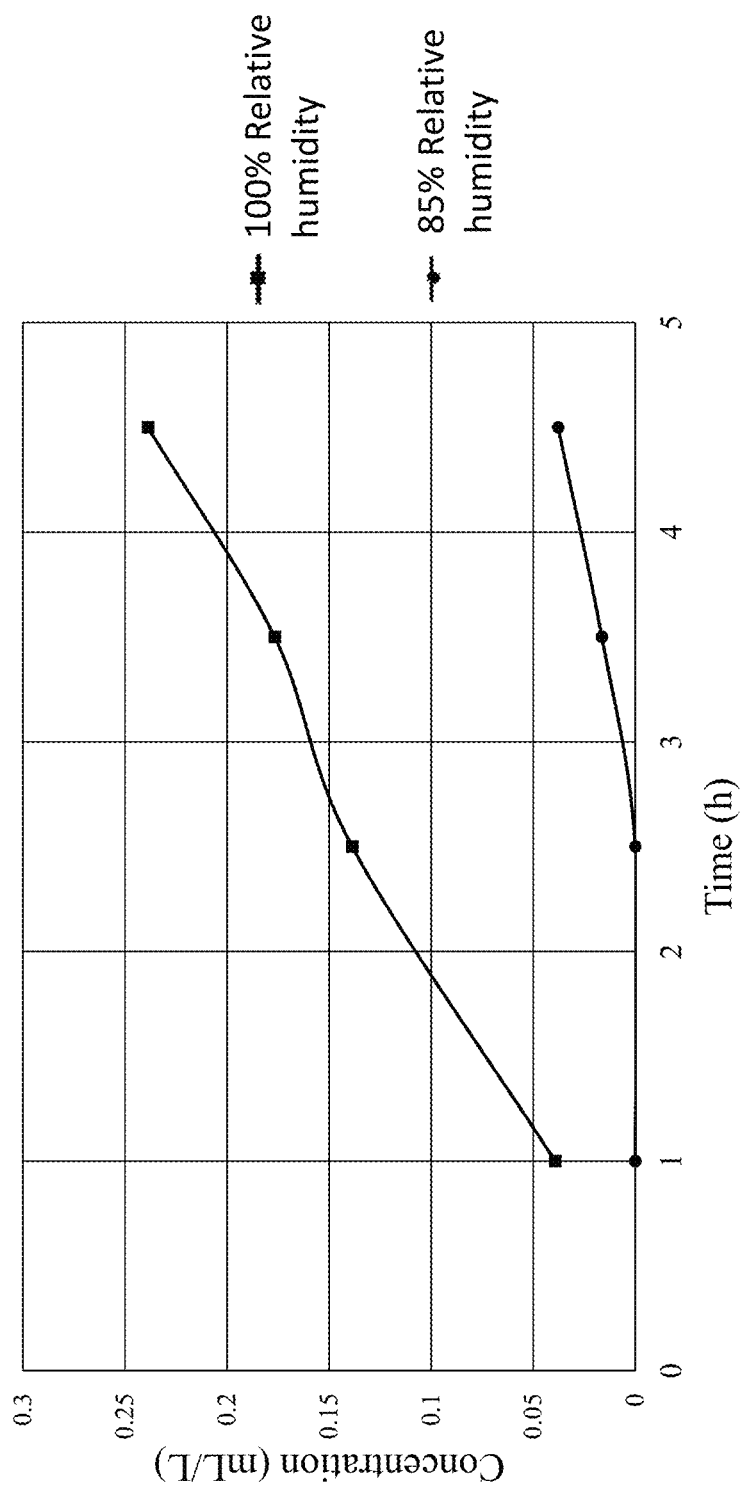
FIG. 2 is a graph showing dependence of the concentration of isolated 1-MCP (mL/L) from a time (h) at a relative humidity of 85% and 100% for Example A-1.
Figure 3:
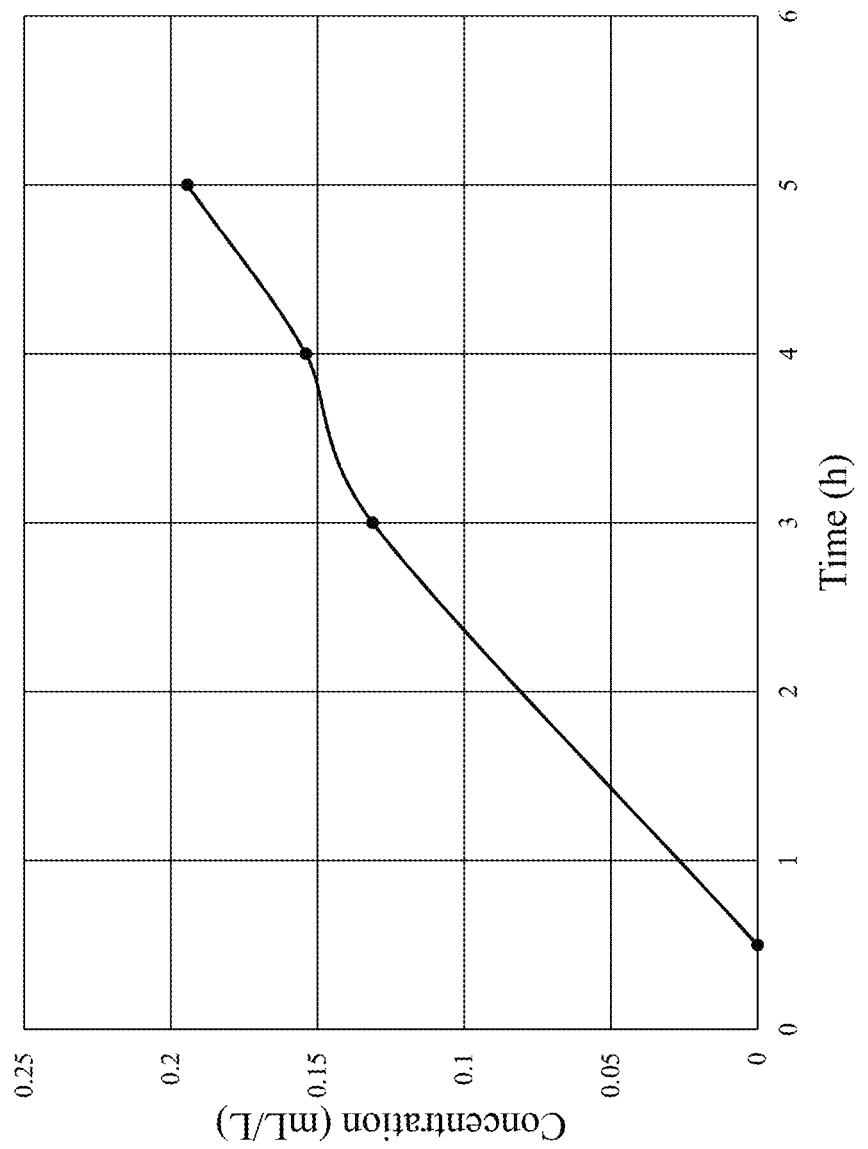
FIG. 3 is a graph showing dependence of the concentration of isolated 1-MCP (mL/L) from a time (h) in the moisture content of apple for Example A-1.

The invention will now be described further by way of the following examples.

A. Labels

Example 1

Poly(vinylpyrrolidone) (MW=10,000) (25% by weight) was dissolved in 2-propanol (50% by weight) and the 1-methylcyclopropene/alpha-cyclodextrin complex (25% by weight) was added (the 1-MCP content in the complex was 3.3%). The resulting paste was applied to self-adhesive paper by screen printing (polyester mesh 64 T, resolution 160 dpi). After drying at room temperature, labels were cut from the paper and tested by placing each in gas-tight containers with sampling valves under conditions of defined humidity.

6.4 cm×4.6 cm labels were placed in a 900 ml glass vessel. A container with a saturated solution of the appropriate salt was placed in the vessel to obtain the correct relative humidity, or a sponge soaked in water was placed in the vessel instead of salt solution to obtain 100% relative humidity. 250 µL of cis-2-butene was introduced into the vessel with a gas-tight syringe.

The concentration of 1-MCP was determined as compared to cis-2-butene as a reference, using a gas chromatograph equipped with a PoraBOND Q column: 25 m×0.25 mm internal diameter (i.d.)×3 µm and a flame ionization detector (FID). Cis-2-butene was used as a reference because it has the same response from an FID detector as 1-methylcyclopropene.

For analysis, 250 µL gas was collected with a gas-tight syringe and injected into the above-mentioned column under the following conditions: temperature of the split/splitless injector 120° C.; isothermal 120° C., temperature of the FID 240° C. detector, split 20:1, carrier gas flow (helium) 50 cm/s.

Example 2

Poly(vinylpyrrolidone) (MW=10,000) (40 wt %) was dissolved in 2-propanol (40 wt %) and the 1-methylcyclopropene/alpha-cyclodextrin complex (20 wt %) was added (the 1-MCP content in the complex was 3.3%). The resulting paste was applied to the self-adhesive paper by screen printing (polyester mesh 64 T, resolution 160 dpi). After drying at room temperature, labels were cut from the paper and tested by placing them in gas-tight containers with sampling valves under conditions of defined humidity.

The concentration of 1-MCP was determined analogously to Example 1.

Example 3

Poly(vinylpyrrolidone) (MW=10,000) (20 wt %) was dissolved in 2-propanol (40 wt %) and the 1-methylcyclopropene/alpha-cyclodextrin complex (40 wt %) was added (the 1-MCP content in the complex was 3.3%). The resulting paste was applied to the self-adhesive paper by screen printing (polyester mesh 64 T, resolution 160 dpi). After drying at room temperature, labels were cut from the paper and tested by placing them in gas-tight containers with sampling valves under conditions of defined humidity.

The concentration of 1-MCP was determined analogously to Example 1.

Example 4

Poly(vinylpyrrolidone) (MW=10,000) (45 wt %) was dissolved in 2-propanol (40 wt %) and the 1-methylcyclopropene/alpha-cyclodextrin complex (15 wt %) was added (the 1-MCP content in the complex was 3.3%). The resulting paste was applied to the self-adhesive paper by screen printing (polyester mesh 64 T, resolution 160 dpi). After drying at room temperature, labels were cut from the paper and tested by placing them in gas-tight containers with sampling valves under conditions of defined humidity.

The concentration of 1-MCP was determined analogously to Example 1.

Example 5

Poly (1-vinylpyrrolidone-co-vinyl acetate) (MW=13,000) (25% by weight) was dissolved in 2-propanol (50% by weight) and the 1-methylcyclopropene/alpha-cyclodextrin complex (25% by weight) was added (content 1-MCP in the complex was 3.3%). The resulting paste was applied to the self-adhesive paper by screen printing (polyester mesh 64 T, resolution 160 dpi). After drying at room temperature, labels were cut from the paper and tested by placing them in gas-tight containers with sampling valves under conditions of defined humidity.

The concentration of 1-MCP was determined analogously to Example 1.

Example 6

Poly(vinylpyrrolidone) (MW=10,000) (20 wt %) was dissolved in 2-propanol (40 wt %) and the 1-methylcyclopropene/alpha-cyclodextrin complex (20 wt %) was added (the 1-MCP content in the complex was 3.3%), and glycerine (20% by weight). The resulting paste was applied to the self-adhesive paper by screen printing (polyester mesh 64 T, resolution 160 dpi). After drying at room temperature, labels were cut from the paper and tested by placing them in gas-tight containers with sampling valves under conditions of defined humidity.

The concentration of 1-MCP was determined analogously to Example 1.

Example 7

Poly(vinylpyrrolidone) (MW=10,000) (20 wt %) was dissolved in 2-propanol (55 wt %) and the 1-methylcyclopropene/alpha-cyclodextrin complex (20 wt %) was added (the 1-MCP content in the complex was 3.3%), and glycerine (5% by weight). The resulting paste was applied to the self-adhesive paper using screen printing (polyester mesh 64 T, resolution 160 dpi). After drying at room temperature, labels were cut from the paper and tested by placing them in gas-tight containers with sampling valves under conditions of defined humidity.

The concentration of 1-MCP was determined analogously to Example 1.

Example 8

A dry mixture of poly(vinylpyrrolidone) (MW=10,000) (50 wt %) and 1-methylcyclopropene/alpha-cyclodextrin complex (50 wt %) was prepared. The dry mixture was combined with 2-propanol in an amount sufficient to form a paste (for every 10 g of dry mixture, between 5 mL and 20 mL 2-propanol is used). The resulting paste was applied to self-adhesive paper by screen printing (polyester mesh 64 T, resolution 160 dpi). After drying at room temperature, 6.4 cm×4.6 cm labels (29.44 $cm^2$) were cut from the paper and tested for total amount of 1-MCP released and amount of 1-MCP released per $cm^2$ of the label, under 100% relative humidity conditions or 85% relative humidity conditions.

To test the samples under 100% relative humidity conditions, the samples were each placed in a 250 mL bottle and then 2 mL of distilled water was added. Next, the bottle was tightly closed and 250 μL of cis-2-butene was added. To determine the total amount of 1-MCP released and the amount of 1-MCP released per $cm^2$ of label, the samples were analyzed on a gas chromatograph analogously to Example 1. Results are shown in Table 1.

TABLE 1

| Total 1-MCP released under 100% relative humidity | | | | |
|---|---|---|---|---|
| | Sample A | Sample B | Sample C | Sample D |
| 1-MCP (mg/$cm^2$) | 0.04255 | 0.04784 | 0.05125 | 0.05601 |
| 1-MCP (μL) | 17.6 | 19.8 | 21.2 | 23.2 |

To test the samples under 85% relative humidity conditions, the samples were each pasted in 900 mL vessels. To obtain a relative humidity of 85%, a container with a saturated solution of potassium chloride was placed into the vessel. At 20° C., relative humidity for potassium chloride is 85.11±0.29. The vessel was then tightly closed and 250 μL of cis-2-butene was added. The samples were analyzed on a gas chromatograph to measure the concentration of released 1-MCP from the sample over time. At each time interval, samples were removed from the vessels and the concentration was obtained by comparing the areas of the peaks (1-MCP and cis-2-butene). The results are shown in Tables 2-4 and FIGS. 16-23.

TABLE 2

| 1-MCP released over time per $cm^2$ of label (μL/L) at 85% relative humidity | | |
|---|---|---|
| Time (h) | Sample 1 | Sample 2 |
| 1 | — | — |
| 2 | — | — |
| 3 | 1.18 | 0.46 |
| 4 | 2.10 | 1.51 |
| 5 | 2.79 | 2.35 |
| 6 | 2.91 | 2.72 |
| 7 | 3.35 | 3.18 |
| 9.5 | 4.17 | 3.84 |
| 26 | 5.81 | 5.28 |

TABLE 3

1-MCP released over time per cm² of label
(μL/L) at 85% relative humidity

| Time (h) | Sample 3 | Sample 4 |
|---|---|---|
| 1.5 | — | — |
| 2.5 | 1.03 | 1.03 |
| 3.5 | 1.68 | 1.47 |
| 5.5 | 2.83 | 3.04 |
| 17.5 | 5.25 | 5.77 |
| 19 | 5.23 | 6.22 |
| 20.5 | 5.25 | 6.24 |

TABLE 4

1-MCP released over time per cm² of label (μL/L)
at 85% relative humidity

| Time [h] | Sample 5 | Sample 6 | Sample 7 | Sample 8 |
|---|---|---|---|---|
| 1 | — | — | — | — |
| 3 | 0.74 | 0.78 | 1.11 | 0.67 |
| 4 | 1.18 | 1.2 | 1.53 | 1.02 |
| 6 | 1.71 | 1.78 | 1.71 | 1.66 |
| 20 | 2.41 | 2.82 | 2.63 | 2.84 |
| 21 | 2.48 | 2.65 | 2.56 | 2.53 |
| 25 | 2.74 | 3.09 | 2.47 | 2.8 |
| 27 | 3.22 | 3.47 | 3.2 | 3.23 |
| 68 | 3.22 | 3.94 | 2.94 | 3.47 |

The release profiles of different label sizes were also analyzed. Labels were prepared as above, cut to size, and pasted into 2000 mL vessels. To obtain a relative humidity of 85%, a container with a saturated solution of potassium chloride was placed into the vessel. The vessel was then tightly closed and 250 μL of cis-2-butene was added. The samples were analyzed on a gas chromatograph to measure the concentration of released 1-MCP from the sample over time as described above for 100% relative humidity. The measurements are shown in Tables 5-6 and illustrated in FIGS. 24-29.

TABLE 5

1-MCP released over time under 85% relative
humidity for varying label sizes (μL/L)

| Time | 5 cm² | 10 cm² | 20 cm² | 40 cm² |
|---|---|---|---|---|
| 0.5 | — | — | — | — |
| 1 | — | — | — | — |
| 1.5 | — | — | — | — |
| 2 | — | — | — | — |
| 2.5 | — | — | — | 0.09 |
| 3 | — | 0.15 | 0.21 | 0.25 |
| 3.5 | — | — | 0.5 | 0.36 |
| 4 | 0.75 | 0.71 | 0.75 | 0.47 |
| 4.5 | — | 0.93 | 0.91 | 0.69 |
| 5 | 1.19 | 1.19 | — | 0.91 |
| 5.5 | 1.69 | 1.33 | 0.97 | 1.03 |
| 6 | 2.04 | — | 1.11 | 1.27 |
| 24 | 2.49 | 2.72 | 2.59 | 2.58 |

TABLE 6

1-MCP released over time under 85%
relative humidity 100 cm² labels (μL/L)

| Time (h) | 100 cm2 (Sample A) | 100 cm2 (Sample B) |
|---|---|---|
| 0.5 | — | — |
| 1 | — | — |
| 1.5 | — | — |
| 2 | — | — |
| 2.5 | — | — |
| 3 | — | — |
| 3.5 | 0.07 | 0.04 |
| 4 | 0.12 | 0.11 |
| 5 | 0.28 | 0.22 |
| 6 | 0.52 | 0.38 |
| 7 | 0.74 | 0.59 |
| 24 | 2.35 | 2.08 |
| 27.5 | 2.21 | 2.18 |

Example 9

A dry mixture of poly(vinylpyrrolidone) (MW=10,000) (50 wt %), 1-methylcyclopropene/alpha-cyclodextrin complex (25 wt %), and pure alpha-cyclodextrin (25 wt %) was prepared. The dry mixture was combined with 2-propanol in an amount sufficient to form a paste as described in Example A-8. The resulting paste was applied to self-adhesive paper by screen printing (polyester mesh 64 T, resolution 160 dpi). After drying at room temperature, labels were cut from the paper and tested for total amount of 1-MCP released and amount of 1-MCP released per cm² of the label, under 100% relative humidity conditions or 85% relative humidity conditions.

To test under 100% relative humidity conditions, a 6.4 cm×4.6 cm label (29.44 cm²) sample was placed in a 250 mL bottle and then 2 mL of distilled water was added. Next, the bottle was tightly closed and 250 μL of cis-2-butene was added. To determine the total amount of 1-MCP released and the amount of 1-MCP released per cm² of label, the sample was analyzed on a gas chromatograph as described in Example A-8. The sample released 0.02364 mg/cm2 (or 9.8 μL) 1-MCP.

Figure 30:
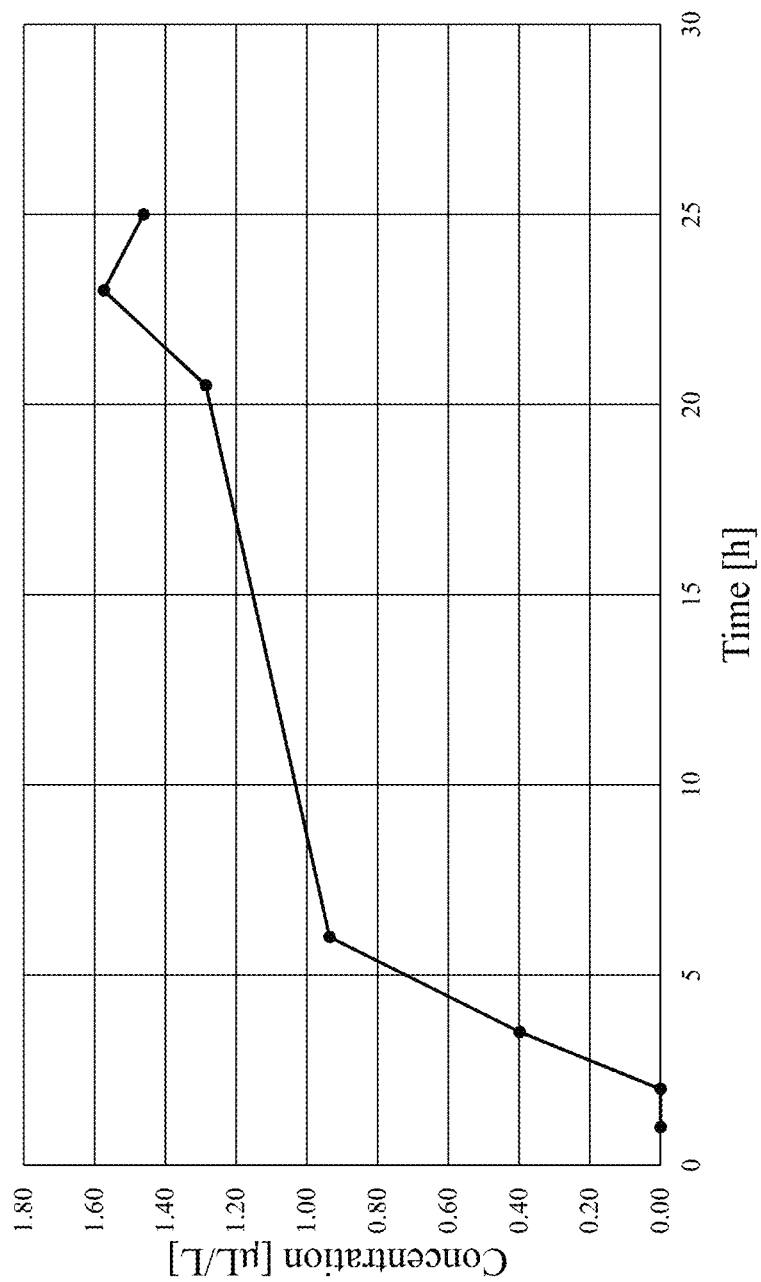
FIG. 30 is a graph showing concentration of 1-MCP released over time per cm² of Sample 1 of Example A-9 at 85% relative humidity.
Figure 31:
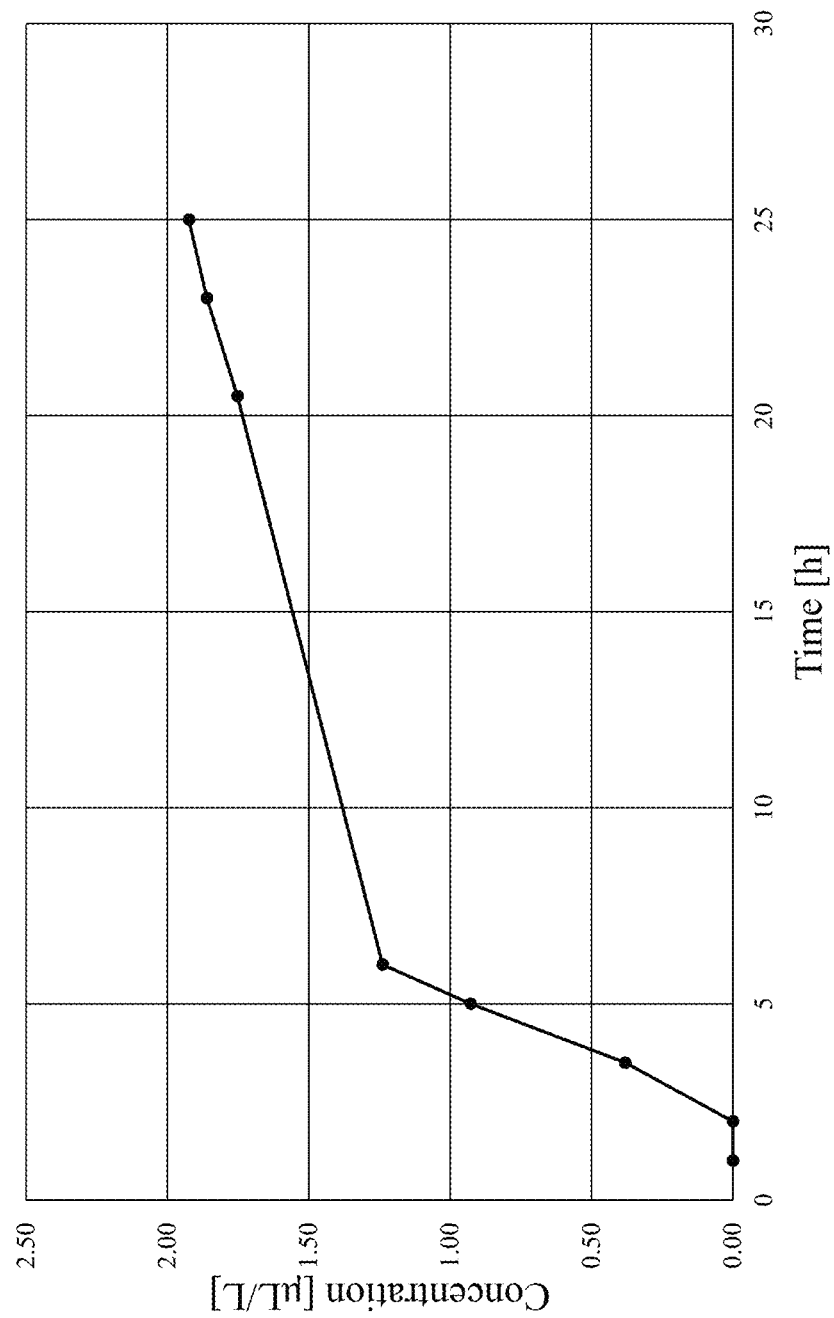
FIG. 31 is a graph showing concentration of 1-MCP released over time per cm² of Sample 2 of Example A-9 at 85% relative humidity.

Two sample labels with a surface area of 20 cm² were tested under 85% relative humidity conditions as described in Example A-8. The results are shown in Table 7 and FIGS. 30-31.

TABLE 7

1-MCP released over time per cm² of label (μL/L)
at 85% relative humidity

| Time (h) | Sample 1 | Sample 2 |
|---|---|---|
| 1 | — | — |
| 2 | — | — |
| 3.5 | 0.399 | 0.381 |
| 5 | — | 0.928 |
| 6 | 0.936 | 1.239 |
| 20.5 | 1.285 | 1.753 |
| 23 | 1.574 | 1.861 |
| 25 | 1.462 | 1.924 |

Example 10

A dry mixture of poly(vinylpyrrolidone) (MW=10,000) (66.7 wt %), and 1-methylcyclopropene/alpha-cyclodextrin complex (33 wt %) was prepared. The dry mixture was combined with 2-propanol in an amount sufficient to form a paste as described in Example A-8. The resulting paste was applied to self-adhesive paper by screen printing (polyester mesh 64 T, resolution 160 dpi). After drying at room temperature, labels were cut from the paper and tested for total amount of 1-MCP released and amount of 1-MCP released per cm² of the label, under 100% relative humidity conditions or 85% relative humidity conditions.

To test under 100% relative humidity conditions, a 6.4 cm×4.6 cm label (29.44 cm2) sample was placed in a 250 mL bottle and then 2 mL of distilled water was added. Next, the bottle was tightly closed and 250 μL of cis-2-butene was added. To determine the total amount of 1-MCP released and the amount of 1-MCP released per cm2 of label, the sample was analyzed on a gas chromatograph as described in Example A-8. The sample released 0.02264 mg/cm² (or 9.4 μL) 1-MCP.

Figure 32:
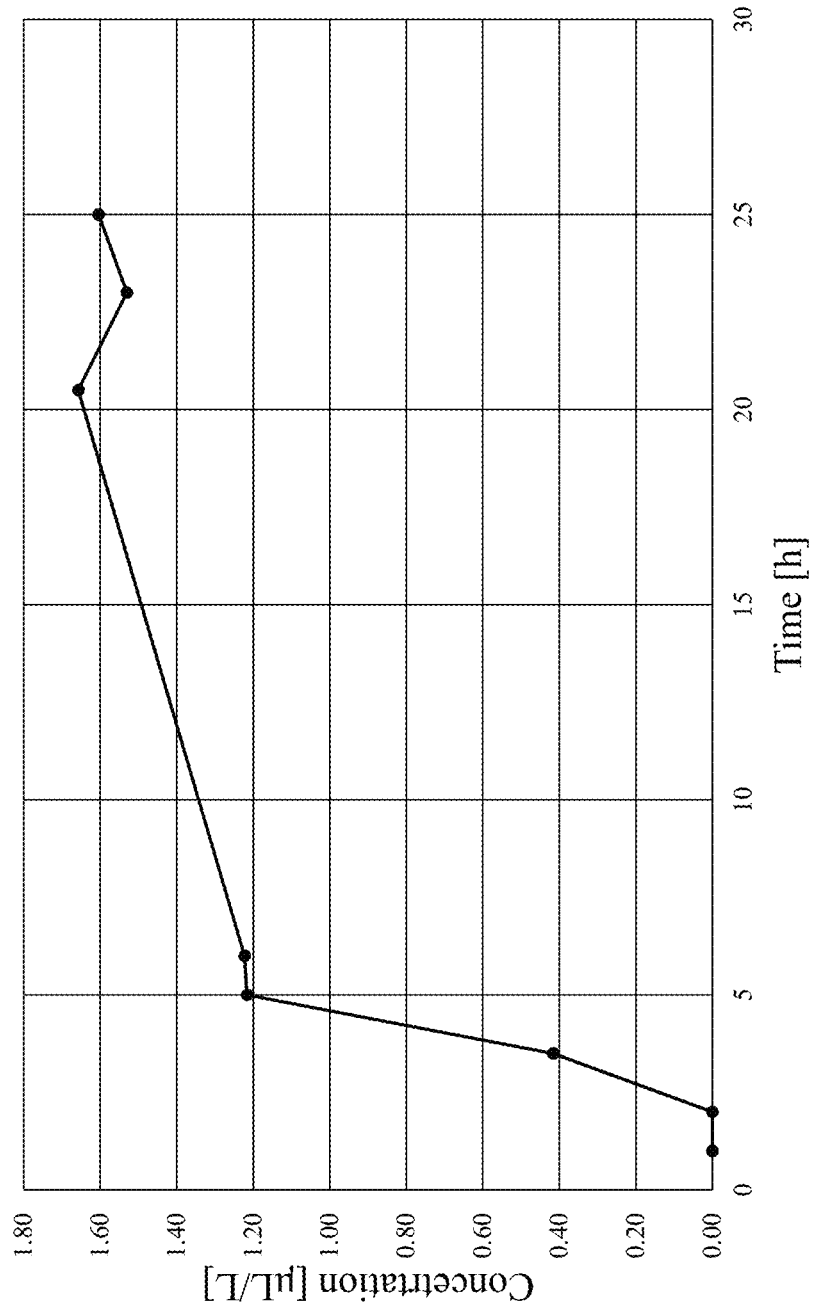
FIG. 32 is a graph showing concentration of 1-MCP released over time per cm² of Sample 1 of Example A-10 at 85% relative humidity.
Figure 33:
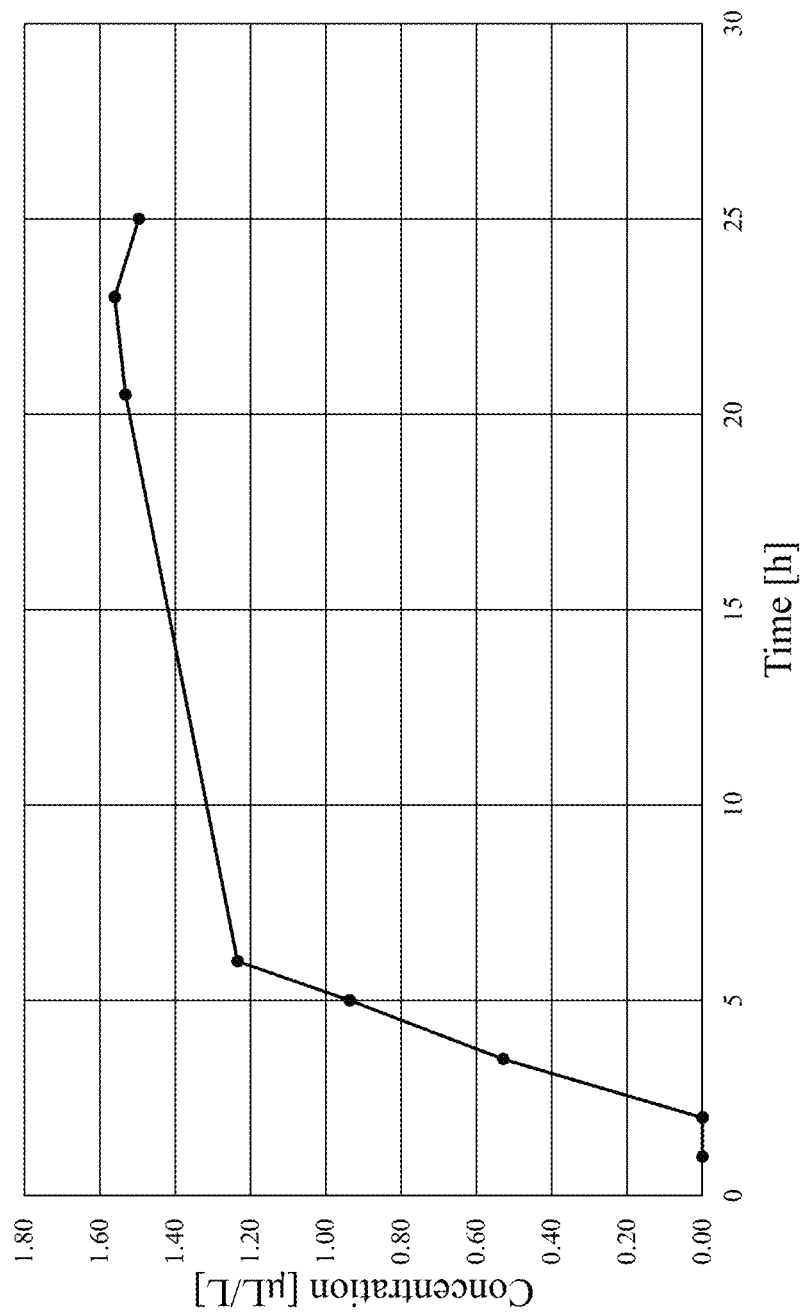
FIG. 33 is a graph showing concentration of 1-MCP released over time per cm² of Sample 2 of Example A-10 at 85% relative humidity.
Figure 34:
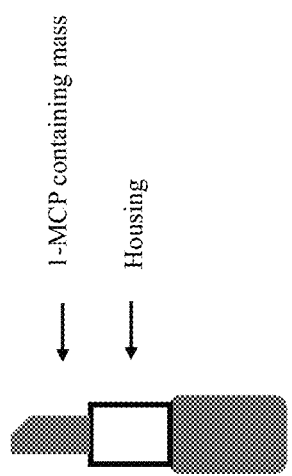
FIG. 34 illustrates an example of a stick containing 1-MCP included in a dispenser for applying the contents of the stick.
Figure 35:
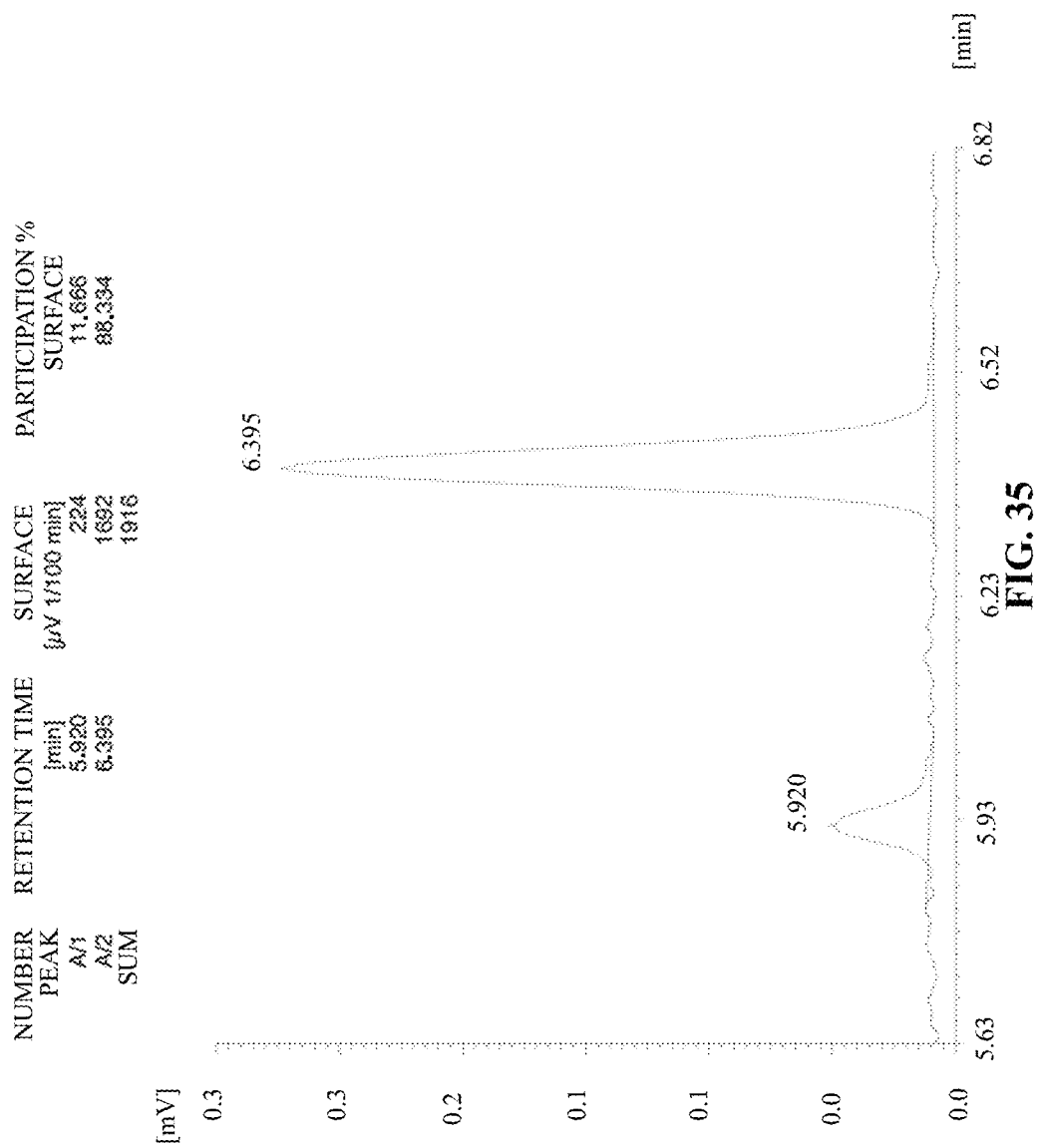
FIG. 35 is a chromatogram presented for the stick described in Example B-1. The 1-MCP retention time was 5.920 min. versus a retention time of 6.395 min. for the cis-2-butene reference standard.
Figure 36:
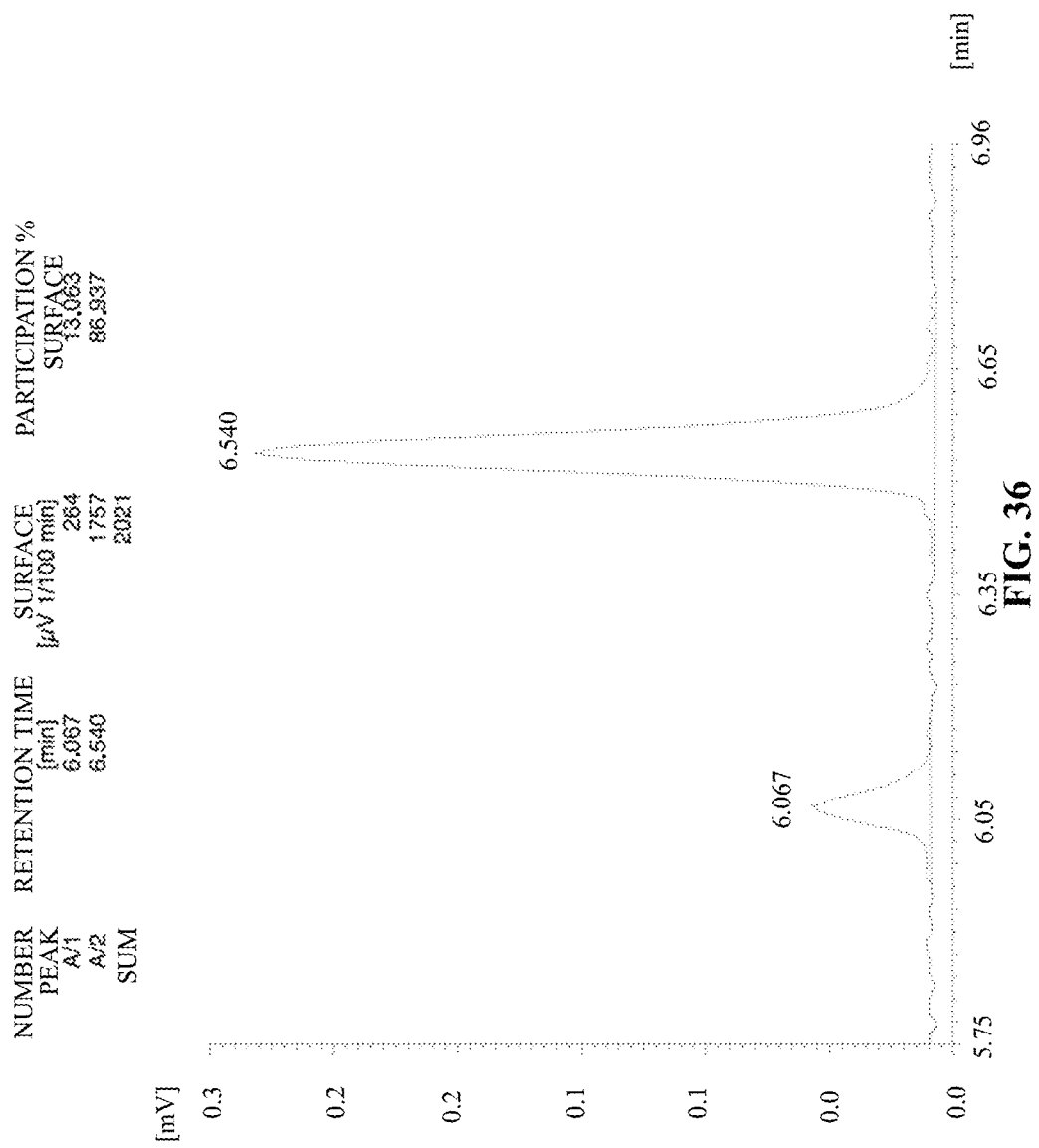
FIG. 36 is a chromatogram presented for the stick described in Example B-2. The 1-MCP retention time was 6.067 min. versus a retention time of 6.540 min. for the cis-2-butene reference standard.
Figure 37:
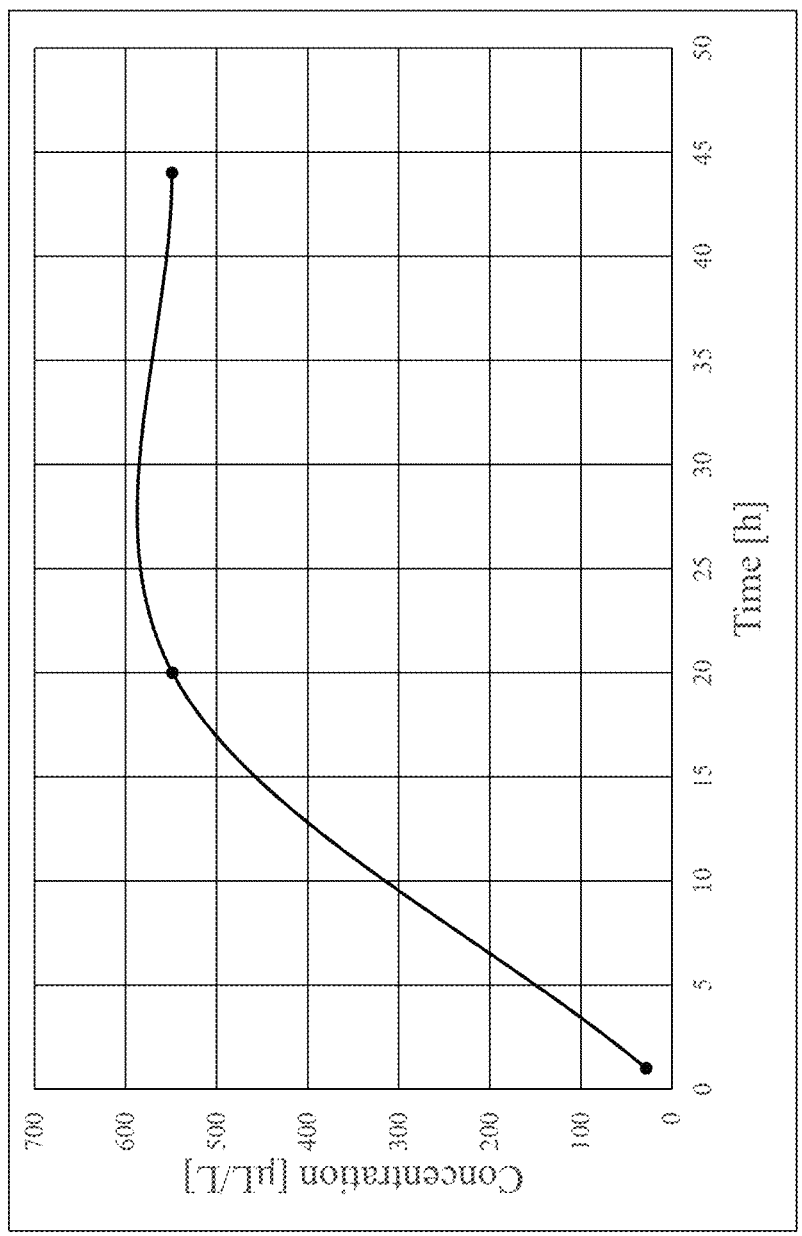
FIG. 37 is a graph showing the concentration of 1-MCP released over the time from the stick described in Example B-3.
Figure 38:
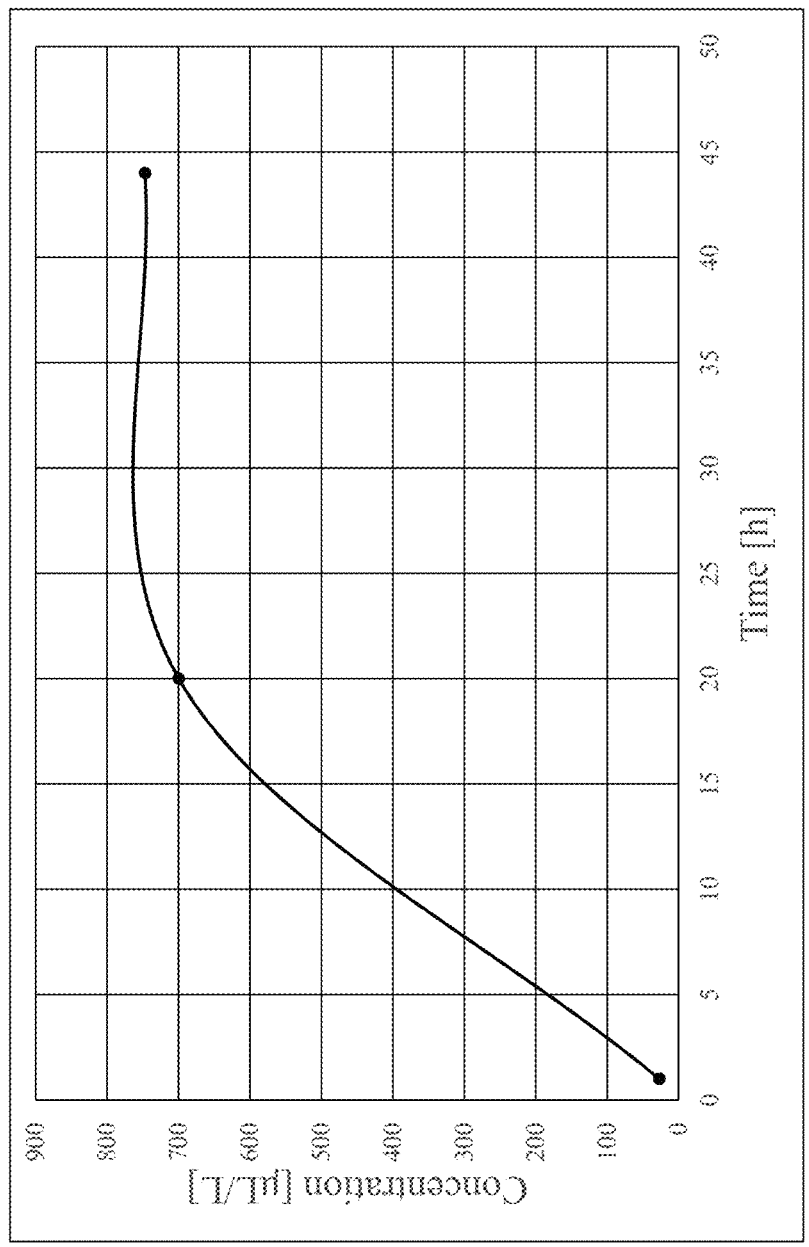
FIG. 38 is a graph showing the concentration of 1-MCP released over time from the stick described in Example B-4.
Figure 39:
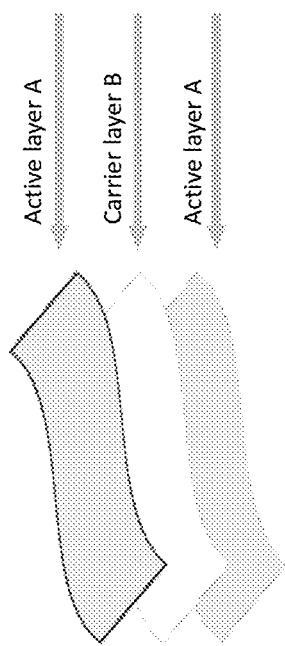
FIG. 39 shows the construction of a functional film in ABA format, where ABA means the system: active layer A/carrier layer B/active layer A.

Two sample labels with a surface area of 20 cm2 were tested under 85% relative humidity conditions as described in Example A-8. The results are shown in Table 8 and FIGS. 32-33.

TABLE 8

1-MCP released over time per cm² of label (μL/L) at 85% relative humidity

| Time (h) | Sample 1 | Sample 2 |
|---|---|---|
| 1 | — | — |
| 2 | — | — |
| 3.5 | 0.416 | 0.529 |
| 5 | 1.216 | 0.937 |
| 6 | 1.223 | 1.234 |
| 20.5 | 1.657 | 1.532 |
| 23 | 1.53 | 1.561 |
| 25 | 1.604 | 1.497 |

Example 11

A dry mixture of poly(vinylpyrrolidone) (MW=10,000) (50 wt %), 1-methylcyclopropene/alpha-cyclodextrin complex (25 wt %), and glucose (25 wt %) was prepared. The dry mixture was combined with 2-propanol in an amount sufficient to form a paste as described in Example A-8. The resulting paste was applied to self-adhesive paper by screen printing (polyester mesh 64 T, resolution 160 dpi).

Example 12

A dry mixture of poly(vinylpyrrolidone) (MW=10,000) (50 wt %), 1-methylcyclopropene/alpha-cyclodextrin complex (12.5 wt %), and pure alpha-cyclodextrin (37.5 wt %) was prepared. The dry mixture was combined with 2-propanol in an amount sufficient to form a paste as described in Example A-8. The resulting paste was applied to self-adhesive paper by screen printing (polyester mesh 64 T, resolution 160 dpi).

Example 13

A dry mixture of poly(vinylpyrrolidone) (MW=10,000) (50 wt %), 1-methylcyclopropene/alpha-cyclodextrin complex (12.5 wt %), and glucose (37.5 wt %) was prepared. The dry mixture was combined with 2-propanol in an amount sufficient to form a paste as described in Example A-8. The resulting paste was applied to self-adhesive paper by screen printing (polyester mesh 64 T, resolution 160 dpi).

Example 14

A dry mixture of poly(vinylpyrrolidone) (MW=10,000) (50 wt %), 1-methylcyclopropene/alpha-cyclodextrin complex (25 wt %), pure alpha-cyclodextrin (12.5 wt %), and glucose (12.5 wt %) was prepared. The dry mixture was combined with 2-propanol in an amount sufficient to form a paste as described in Example A-8. The resulting paste was applied to self-adhesive paper by screen printing (polyester mesh 64 T, resolution 160 dpi).

B. Stick

Example 1

Polyvinylpyrrolidone (PVP) (45 wt. %, MW=10,000), 1-MCP/α-cyclodextrin complex (5 wt. %, 1-MCP content=3.4%), cochineal red (0.5 wt. %), and isopropyl alcohol (49.5 wt. %) were placed in a round bottom flask. The contents of the flask were mixed using a magnetic stirrer for 0.5 hours at room temperature. Isopropanol was then removed at 40° C. under reduced pressure on a rotary evaporator. The resulting mass was formed in the form of a stick and then evenly spread on paper with a weight of 100 g/m² and an area of 6.9 cm×7.8 cm. After drying, samples were prepared for analysis and tested for 1-MCP per 1 cm² of support. The paper with the mass applied was cut and placed in a 250 mL bottle, then 2 mL distilled water was added to the bottle and sealed with a Mininert® valve plug, followed by 250 μL cis-2-butene with a gas-tight syringe. The samples were shaken for 30 minutes at a frequency of 600 cycles/min.

The concentration of 1-MCP was determined against the standard, which was cis-2-butene, using a gas chromatograph equipped with a PoraBOND Q column: 25 m×0.25 mm (i.d.)×3 μm and a flame ionization detector (FID). Cis-2-butene was used as a standard because it has the same response from an FID detector as 1-methylcyclopropene. From a previously prepared test in a 250 mL bottle, 250 μL gas was withdrawn with a gas-tight syringe and injected into the above-mentioned column under the following conditions: temperature of the split/splitless dispenser 120° C.; isothermal 120° C., temperature of the FID 240° C. detector, split 20:1, carrier gas flow (helium) 50 cm/s. After a single application, the concentration of 1-MCP on the material as mentioned above was 0.0122 mg/cm².

Example 2

Coconut oil (53 wt. %), emulsifier SE-PF (20 wt. %), stearic acid (10 wt. %) beeswax (9.5 wt. %), cochineal red (0.5 wt. %), polyvinylpyrrolidone (PVP) (2 wt. %, MW=10,000), and a 1-MCP/α-cyclodextrin complex (5 wt. %, 3.3% 1-MCP) was mixed using a mechanical stirrer in a round bottom flask placed in an oil bath at 70° C. until a uniform consistency was obtained. The mass obtained was formed in the form of a stick and tested for 1-MCP per 1 cm² of 100 g/m² paper.

After a single application, the concentration of 1-MCP on the material as mentioned above was 0.0106 mg/cm². The concentration was determined analogously to Example B-1.

Example 3

1-Methylcyclopropene/α-cyclodextrin complex (50 wt. %, content of 1-MCP 3.3%), beeswax (24 wt. %), candelilla wax (24 wt. %), and polyvinylpyrrolidone (PVP) (2 wt. %, MW=10,000) were placed in a mortar. The substances were mixed for 15 minutes to obtain a uniform consistency. The obtained mass was formed in the form of a stick and tested for 1-MCP per 1 $cm^2$ of 100 $g/m^2$ paper.

After a single application, the concentration of 1-MCP on the material as mentioned above was 0.007805 $mg/cm^2$. The concentration was determined analogously to Example B-1.

Example 4

Beeswax (24 wt. %), candelilla wax (24 wt. %), and polyvinylpyrrolidone (PVP) (2 wt %, MW=10,000) were placed in a beaker and heated to melt at 50° C., after which 1-MCP complex with α-cyclodextrin (50% by weight, 1-MCP content was 3.3%) was added. The ingredients were mixed to a homogeneous consistency. After cooling, the resulting mass was formed into a stick and tested for 1-MCP per 1 $cm^2$ of 100 $g/m^2$ paper.

After a single application, the concentration of 1-MCP on the material as mentioned above is 0.01026 $mg/cm^2$. The concentration was determined analogously to Example B-1.

Example 5

1-Methylcyclopropene/α-cyclodextrin complex (30 wt. %, 1-MCP content 3.3%), beeswax (20 wt. %), candelilla wax (20 wt. %), and polyvinylpyrrolidone (PVP) (30 wt. %) were placed in a mortar. The substances were mixed for 15 minutes to obtain a uniform consistency. The resulting mass was formed into a stick and tested for 1-MCP per 1 $cm^2$ of 100 $g/m^2$ paper.

After a single application, the concentration of 1-MCP on the material as mentioned above was 0.02645 $mg/cm^2$. The concentration was determined analogously to Example B-1.

Example 6

Beeswax (20 wt. %) and candelilla wax (20 wt. %) were placed in a beaker and heated to melt at 50° C., after which 1-MCP/α-cyclodextrin complex (30 wt. %, 1-MCP content was 3.3%) and polyvinylpyrrolidone (PVP) (30 wt. %) were added. The components were mixed to a homogeneous consistency. After cooling, the resulting mass was formed into a stick and tested for 1-MCP per 1 $cm^2$ of 100 $g/m^2$ paper.

After a single application, the concentration of 1-MCP on the material as mentioned above is 0.02186 $mg/cm^2$. The concentration was determined analogously to Example B-1.

Example 7

1-Methylcyclopropene/α-cyclodextrin complex (35 wt. %, 1-MCP content 3.3%), glycerol (30 wt. %), and polyvinylpyrrolidone (PVP) (35 wt. %) were placed in a mortar. The substances were mixed for 15 minutes to obtain a uniform consistency. The resulting mass was formed into a stick and tested for 1-MCP per 1 $cm^2$ of 100 $g/m^2$ paper.

After a single application, the concentration of 1-MCP on the material as mentioned above was 0.02894 $mg/cm^2$. The concentration was determined analogously to Example B-1.

Example 8

Beeswax (7.5 wt. %), candelilla wax (7.5 wt. %), and glycerol (15 wt. %) were placed in a beaker and heated to melt at 50° C., after which 1-MCP/α-cyclodextrin complex (30 wt %, 1-MCP content was 3.3%) and polyvinylpyrrolidone (PVP) (30 wt %) were added. The components were mixed to a homogeneous consistency. After cooling, the resulting mass was formed into a stick and tested for 1-MCP per 1 $cm^2$ of 100 $g/m^2$ paper.

After a single application, the concentration of 1-MCP on the material as mentioned above was 0.02845 $mg/cm^2$. The concentration was determined analogously to Example B-1.

The 1-MCP concentration was also analyzed at 100% humidity at room temperature using the sticks prepared in Examples B-3 and B-4. The paper sheet with the mass applied was placed in a 900 mL glass vessel. A sponge soaked in water was inserted into the dish and then sealed, and 250 μL of cis-2-butene was introduced with a gas-tight syringe.

The concentration was determined against the standard, which was cis-2-butene, using a gas chromatograph equipped with a PoraBOND Q column: 25 m×0.25 mm (i.d.)×3 μm and a flame ionization detector (FID). Cis-2-butene was used because it has the same response from an FID detector as 1-methylcyclopropene.

For analysis, 250 μL gas was collected with a gas-tight syringe and injected into the above-mentioned column under the following conditions: temperature of the split/splitless dispenser 120° C.; isothermal 120° C., temperature of the FID 240° C. detector, split 20:1, carrier gas flow (helium) 50 cm/s.

Figure 4:
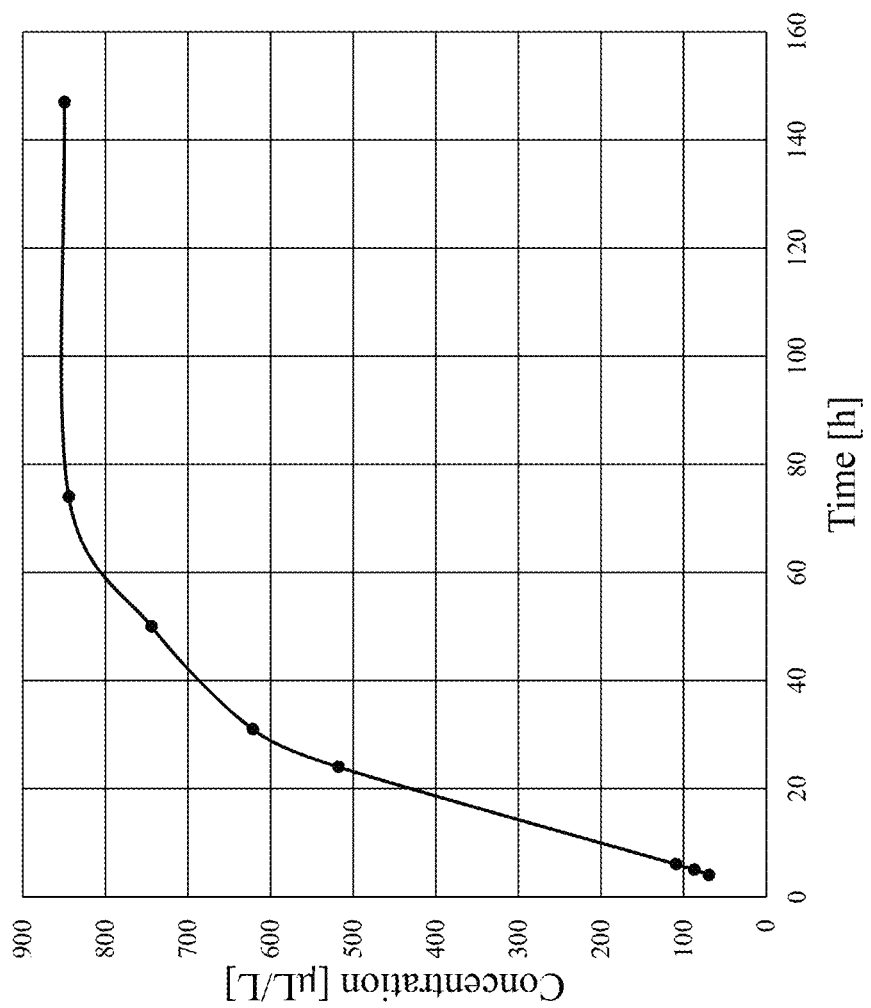
FIG. 4 is a graph showing dependence of the concentration of isolated 1-MCP (µL/L) from a time (h) at a relative humidity of 100% at 6° C. for Example A-1.
Figure 5:
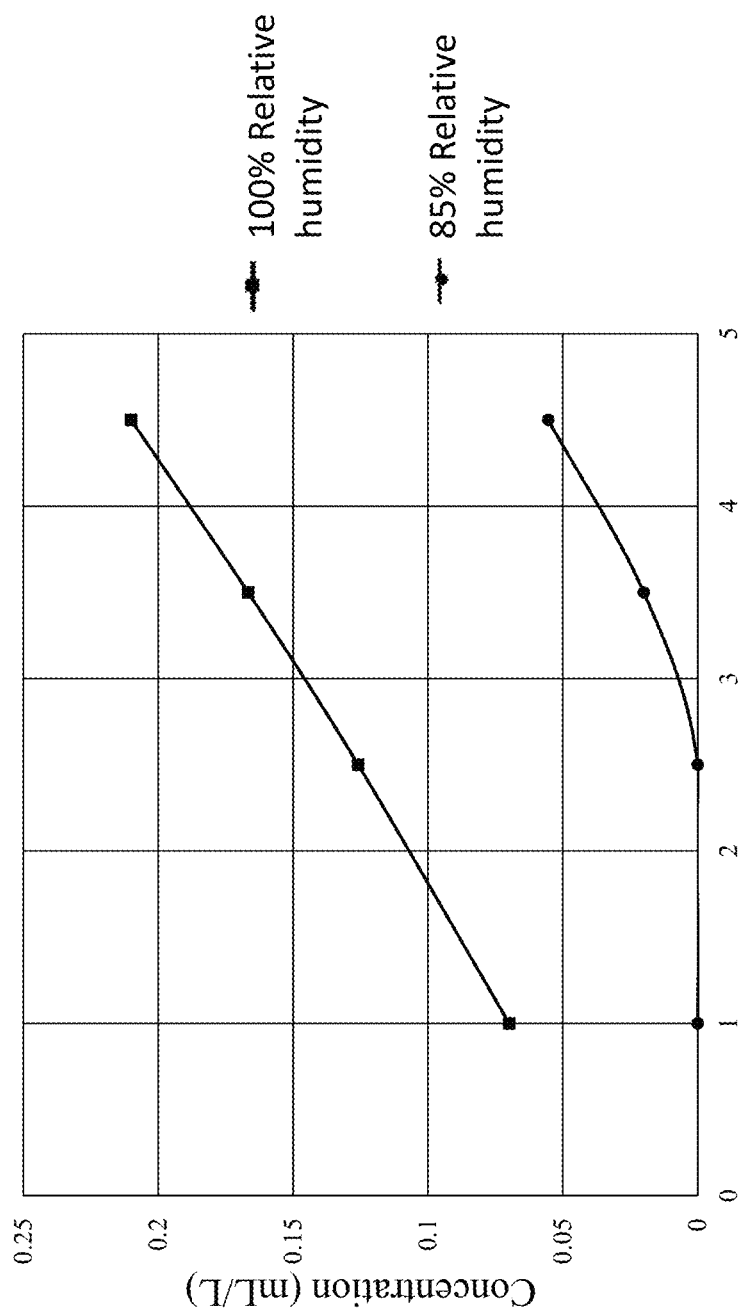
FIG. 5 is a graph showing dependence of the released 1-MCP concentration (mL/L) from time (h) at 85% and 100% relative humidity for Example A-2.
Figure 6:
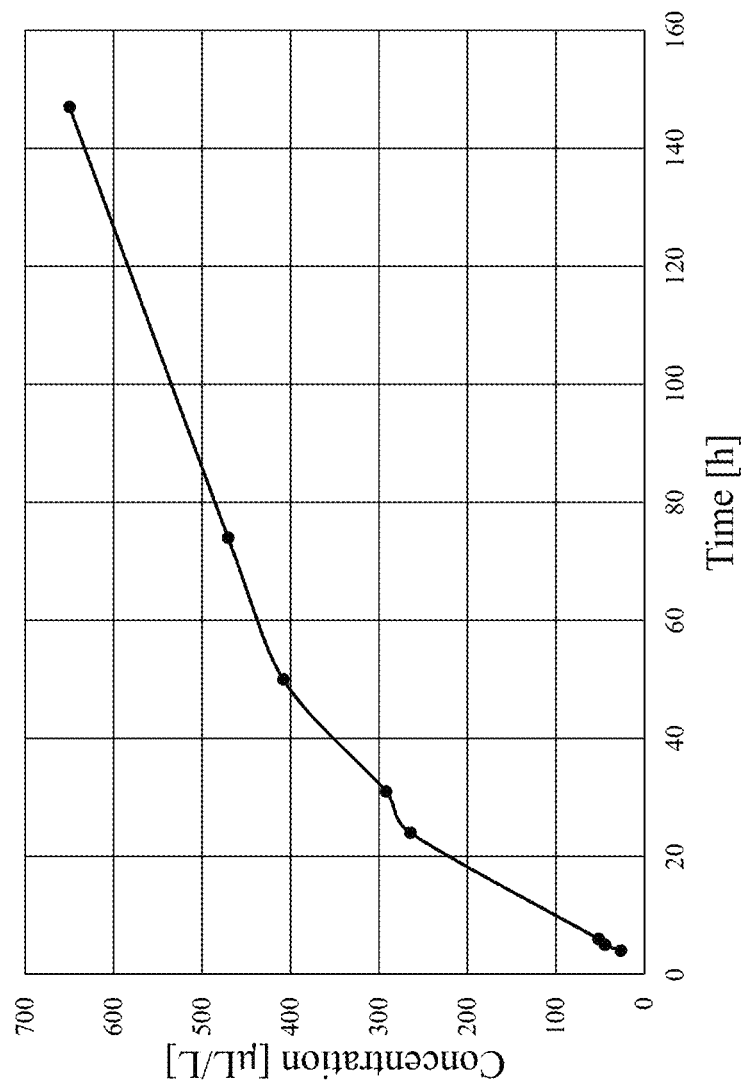
FIG. 6 is a graph showing dependence of the concentration of isolated 1-MCP (µL/L) from a time (h) at a relative humidity of 100% at 6° C. for Example A-2.
Figure 7:
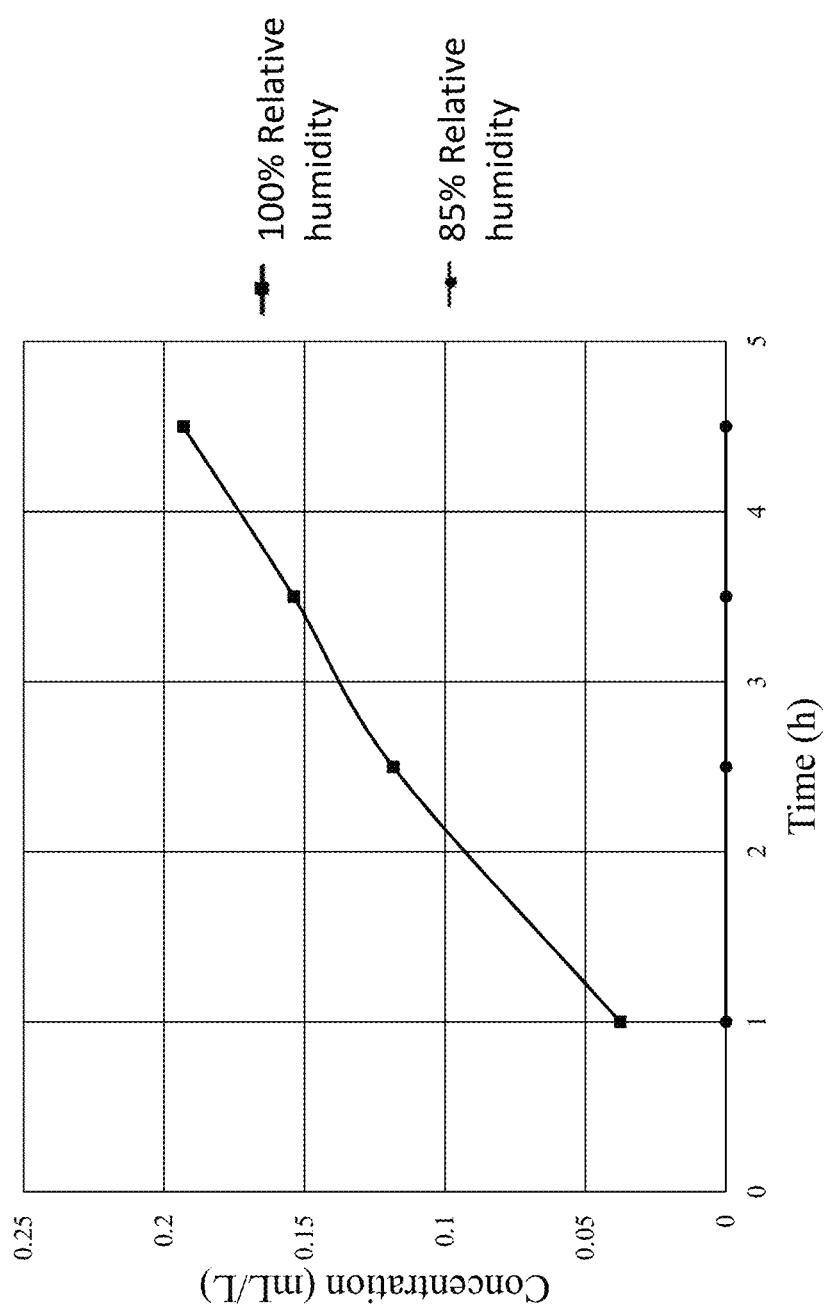
FIG. 7 is a graph showing dependence of the concentration of isolated 1-MCP (mL/L) from a time (h) at a relative humidity of 85% and 100% for Example 3.
Figure 8:
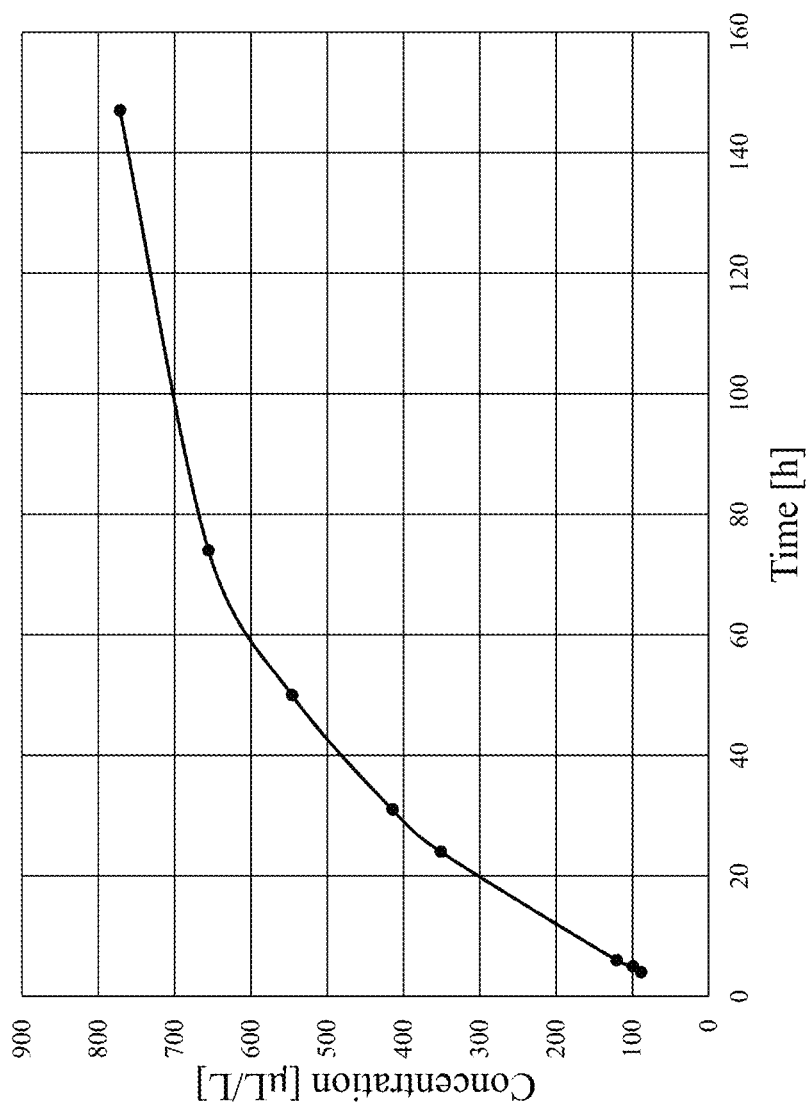
FIG. 8 is a graph showing dependence of the concentration of isolated 1-MCP (µL/L) from a time (h) at a relative humidity of 100% at 6° C. for Example A-3.
Figure 9:
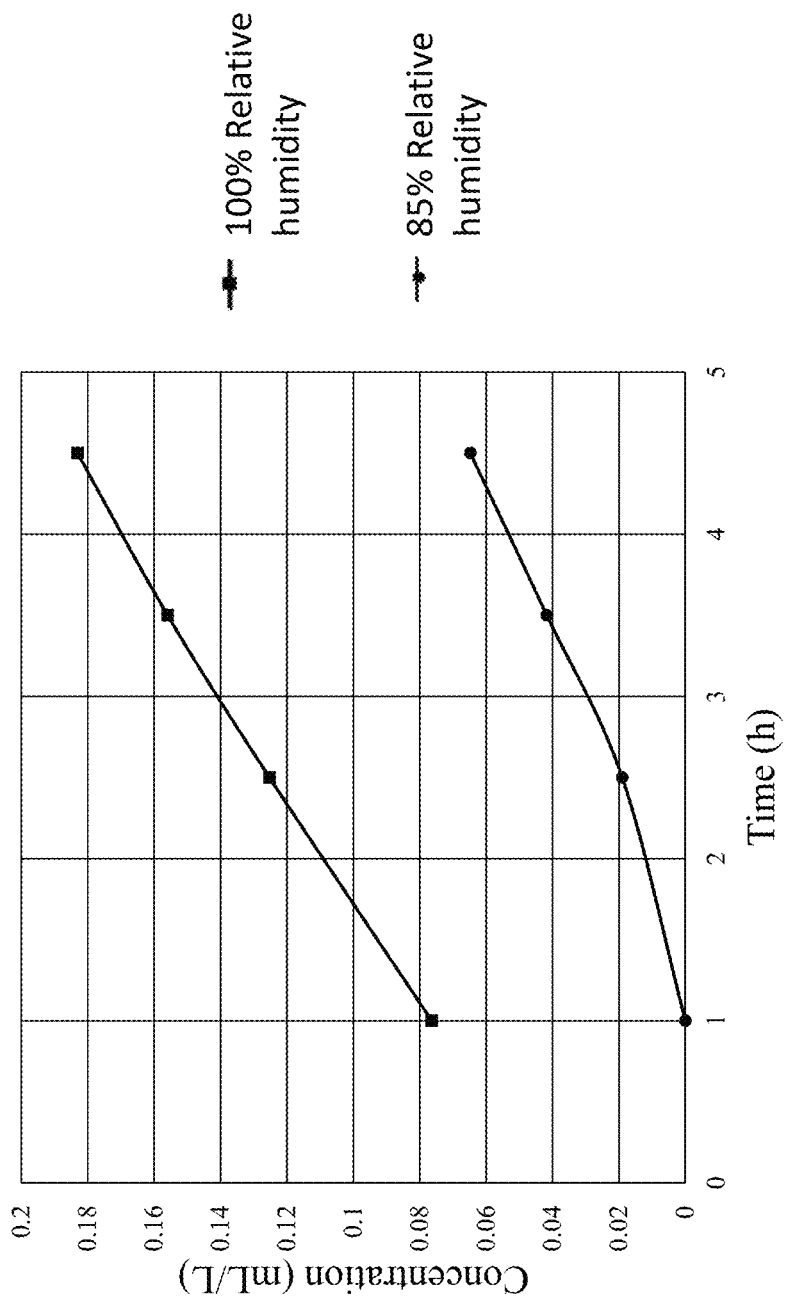
FIG. 9 is a graph showing dependence of the concentration of isolated 1-MCP (mL/L) from a time (h) at a relative humidity of 85% and 100% for Example A-4.
Figure 10:
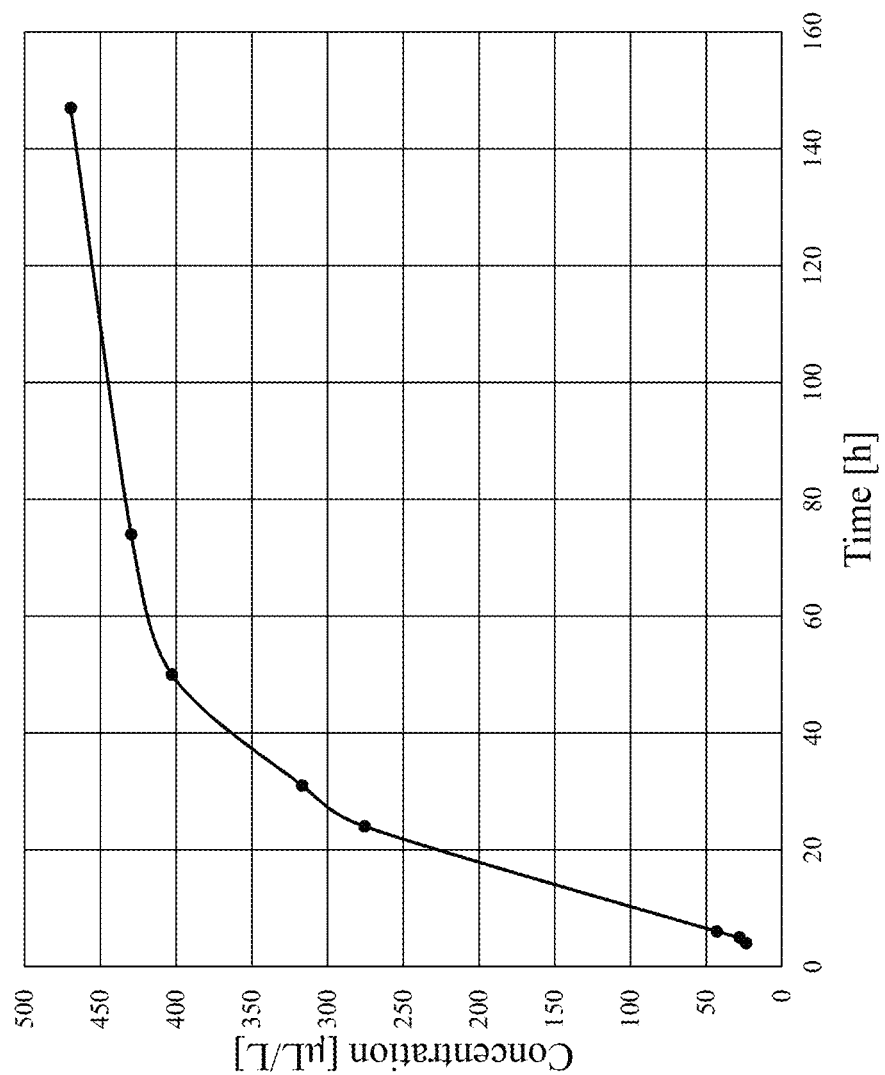
FIG. 10 is a graph showing dependence of the concentration of isolated 1-MCP (µL/L) from a time (h) at a relative humidity of 100% at 6° C. for Example A-4.
Figure 11:
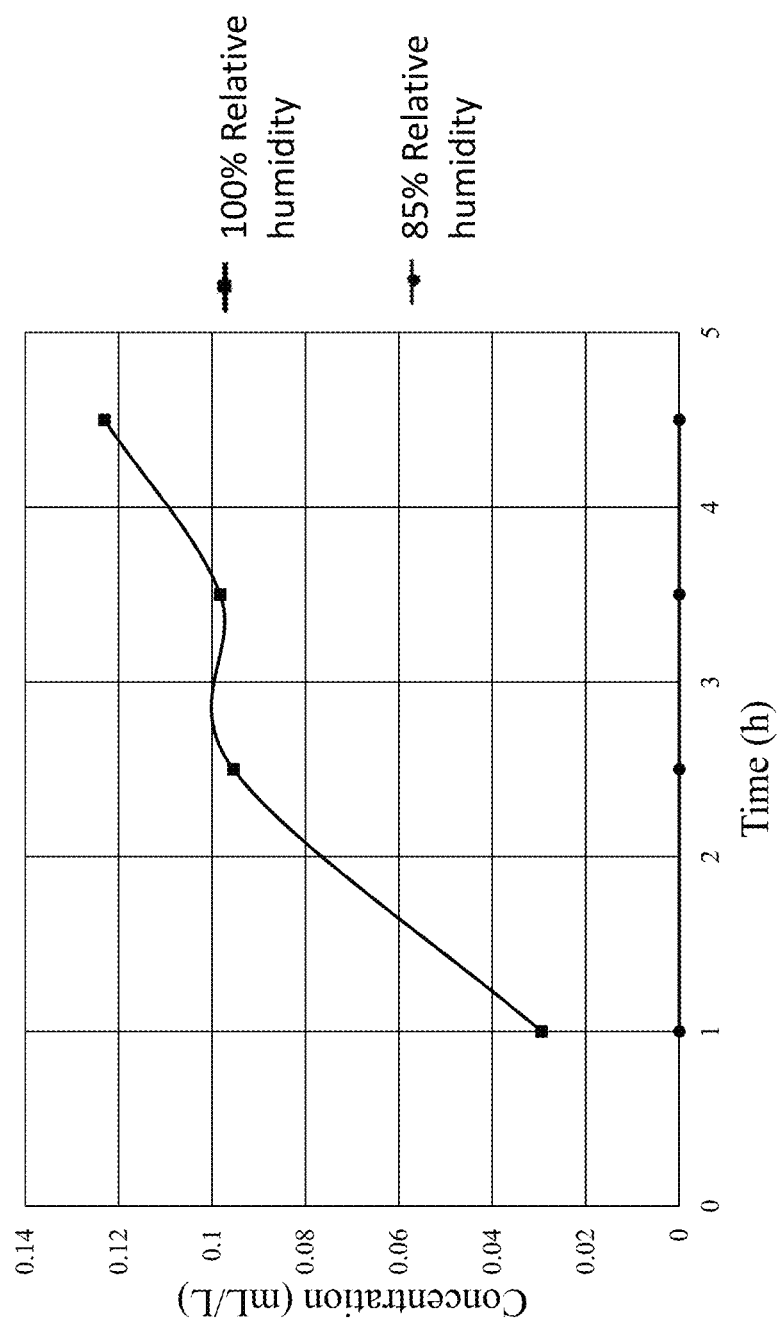
FIG. 11 is a graph showing dependence of the concentration of isolated 1-MCP (mL/L) from a time (h) at a relative humidity of 85% and 100% for Example A-5.
Figure 12A:
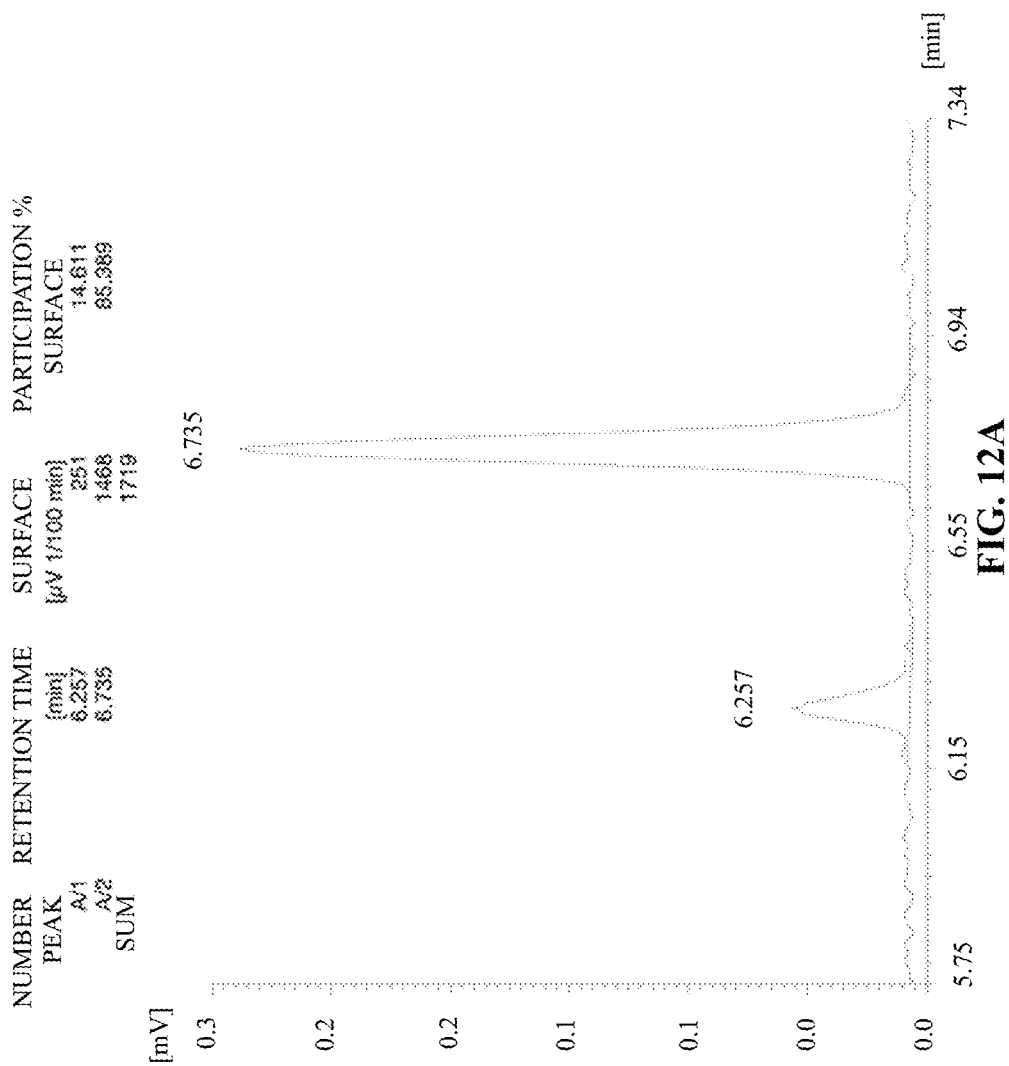
FIG. 12A is a chromatogram from which the concentration presented in FIG. 11 was determined.
Figure 12B:
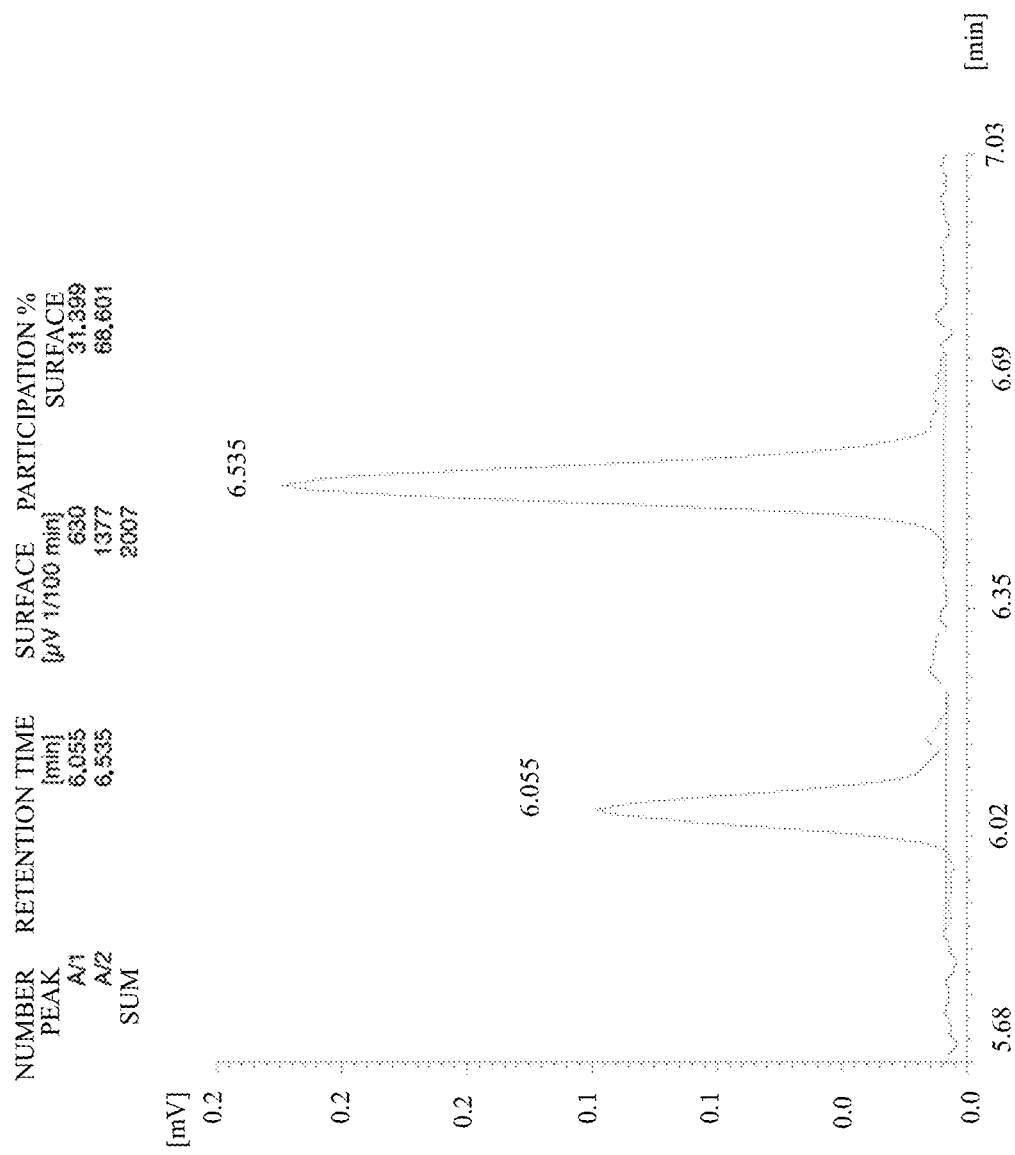
FIG. 12B is a chromatogram from which the concentration presented in FIG. 11 was determined.
Figure 13A:
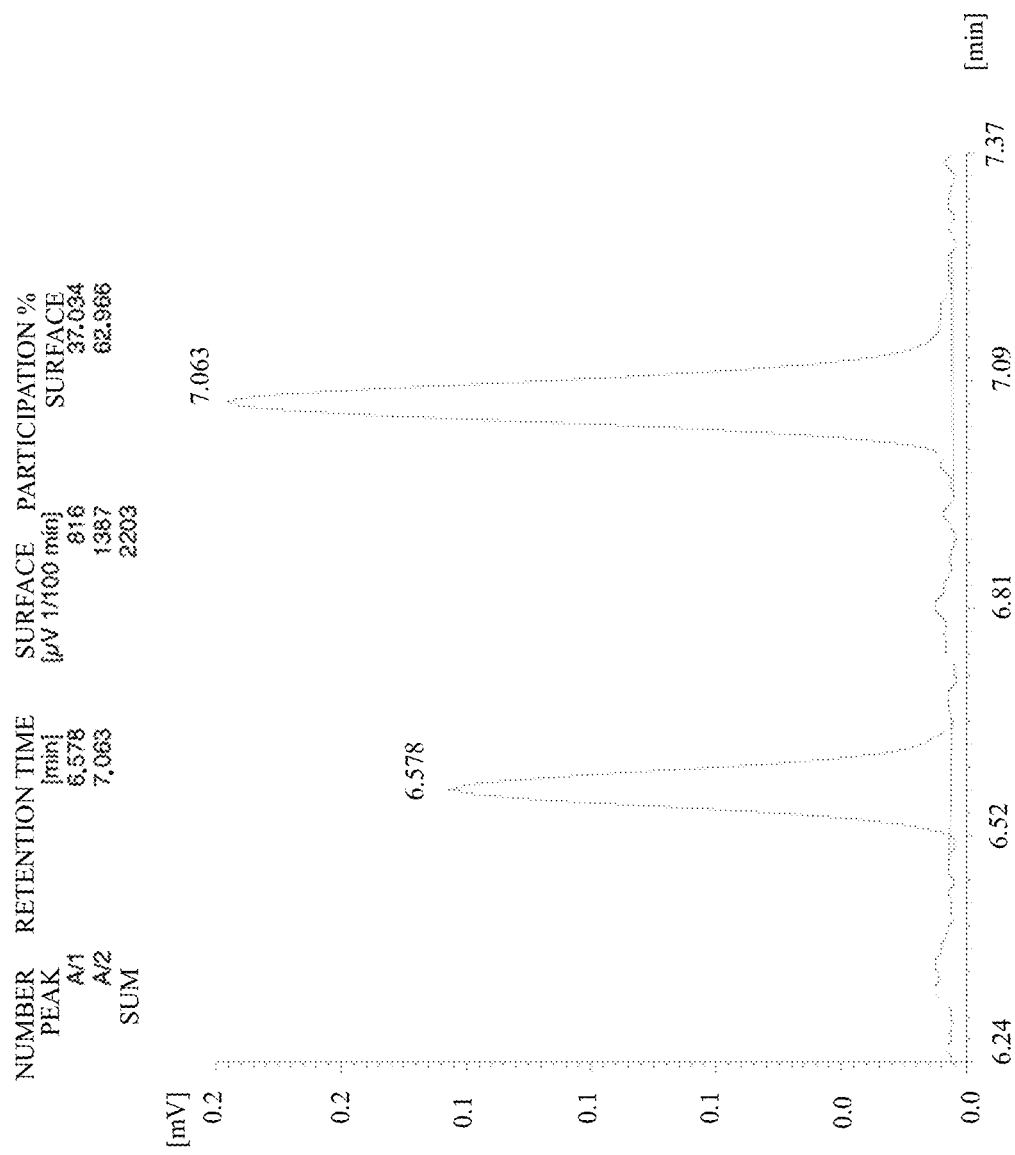
FIG. 13A is a chromatogram from which the concentration presented in FIG. 11 was determined.
Figure 13B:
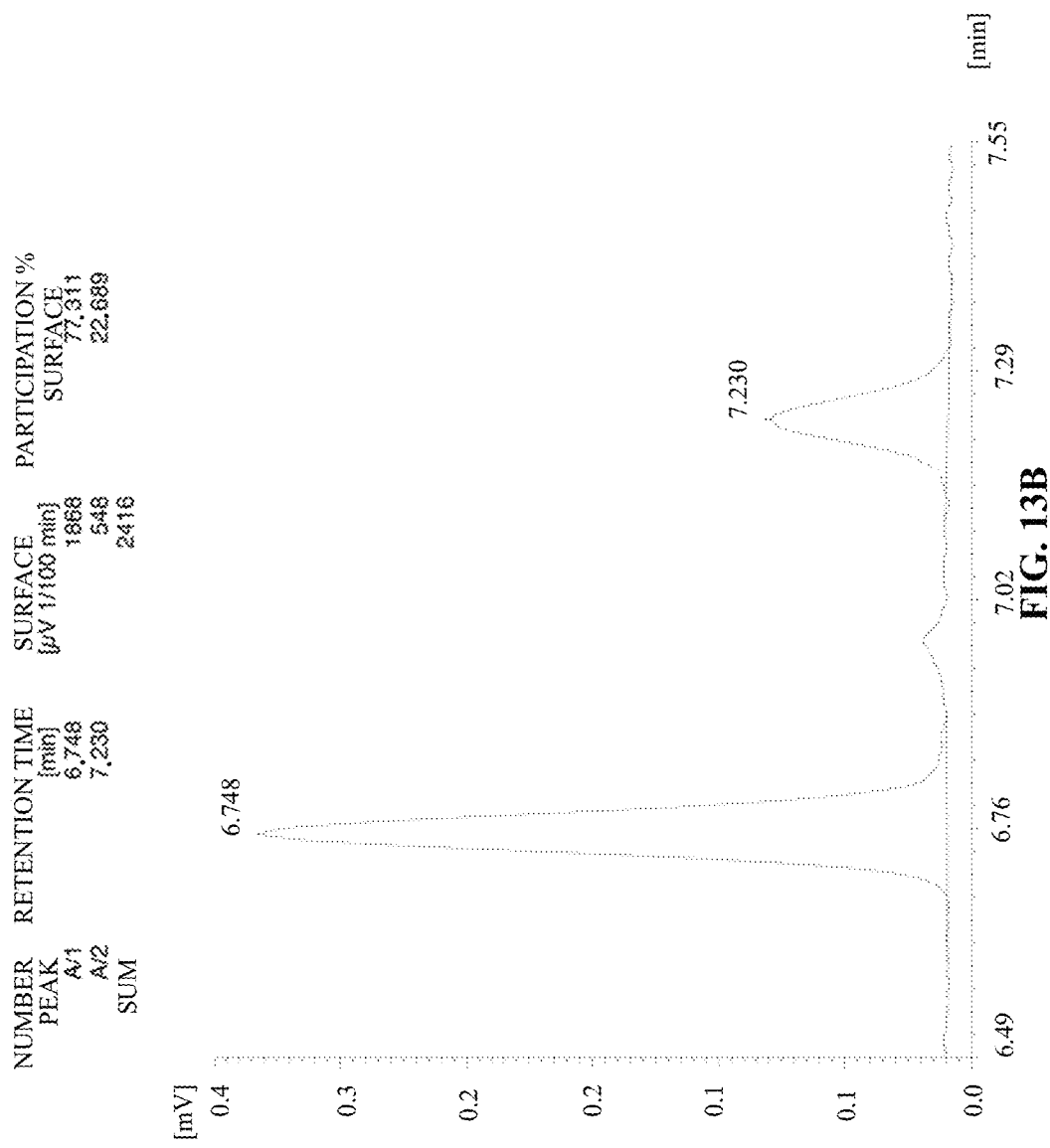
FIG. 13B is a chromatogram from which the concentration presented in FIG. 11 was determined.
Figure 14:
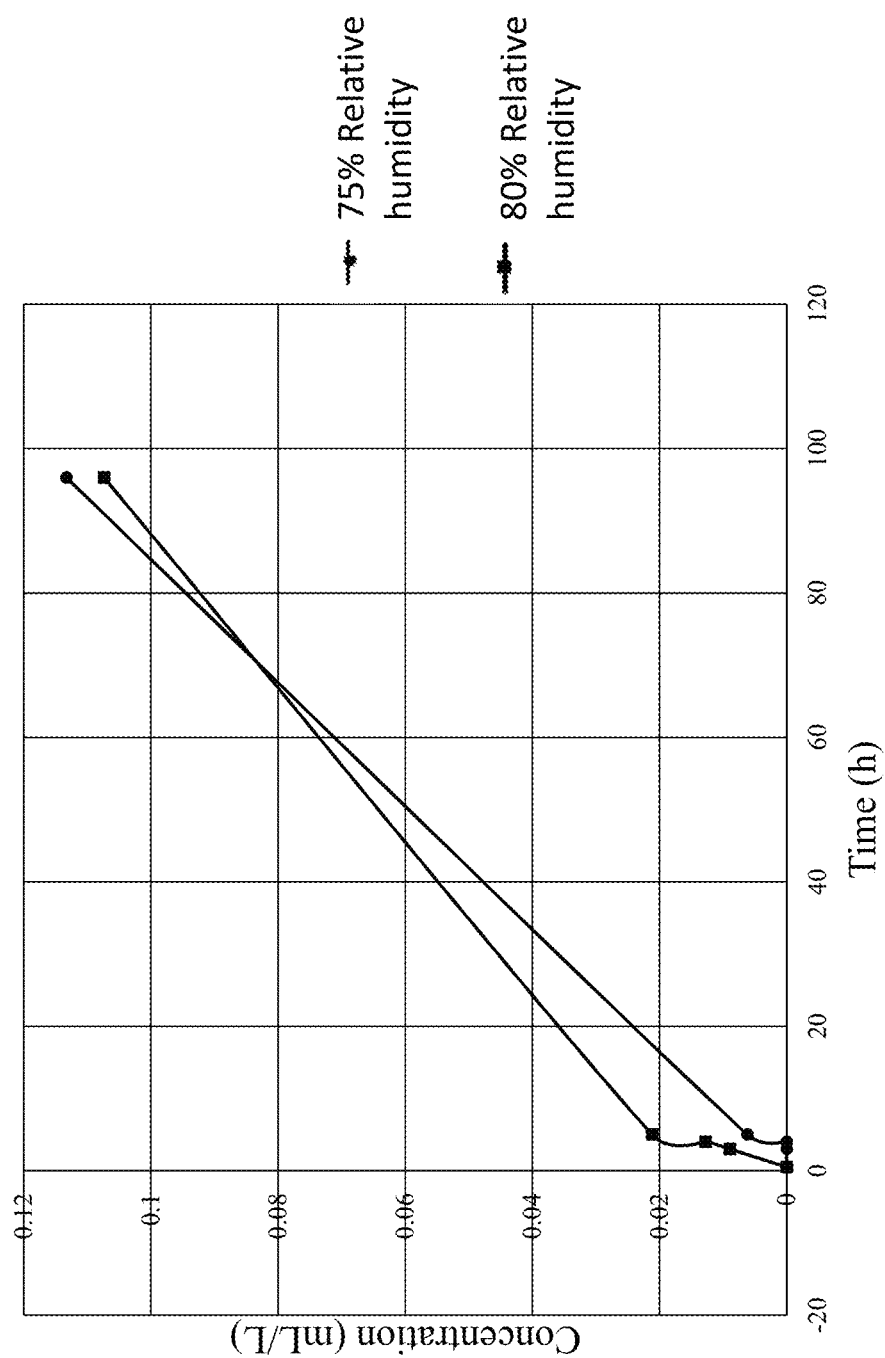
FIG. 14 is a graph showing dependence of 1-MCP isolated concentration (mL/L) from time (h) at 75% and 80% relative humidity for Example A-6.
Figure 15:
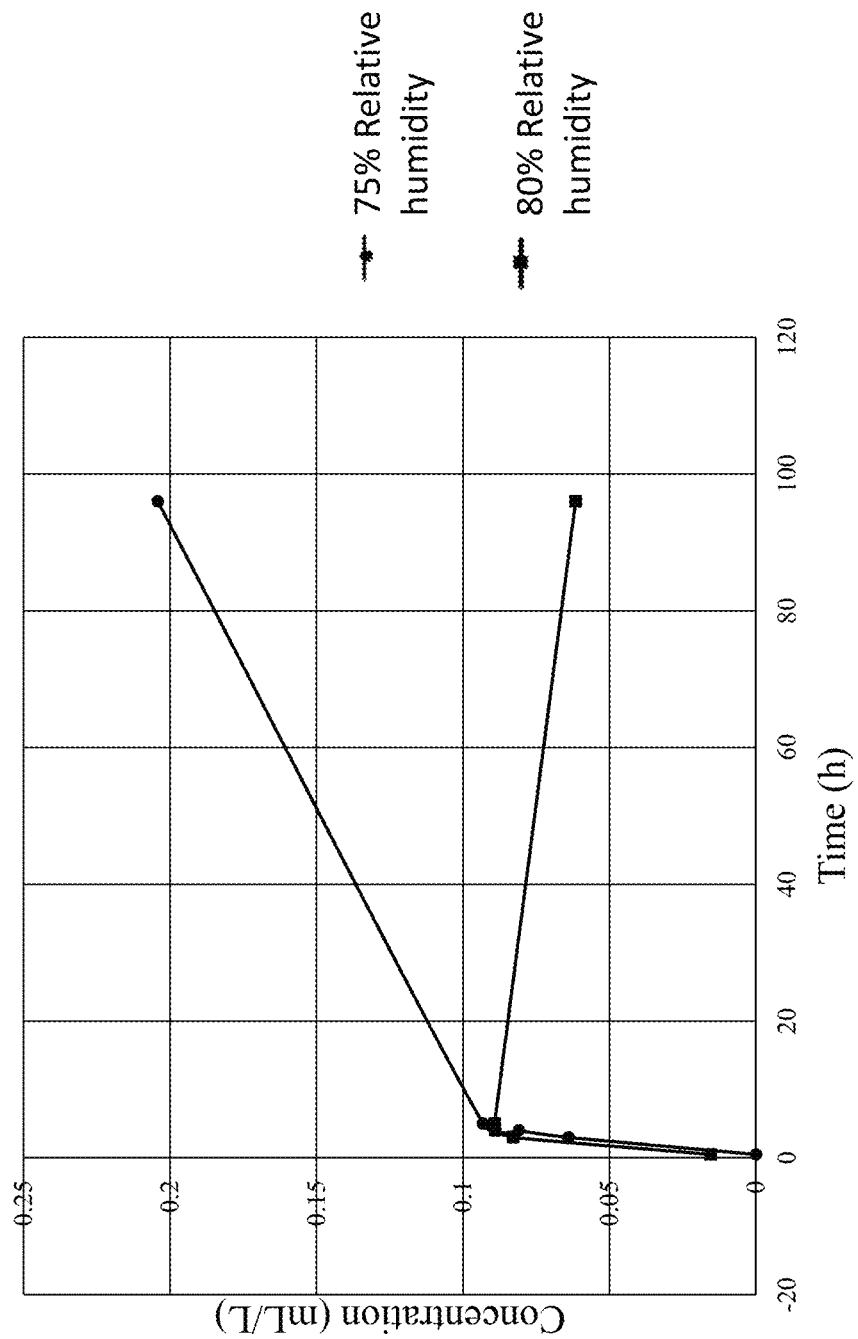
FIG. 15 is a graph showing dependence of the secreted concentration of 1-MCP (mL/L) from a time (h) at a relative humidity of 85% and 100% for Example A-7.
Figure 16:
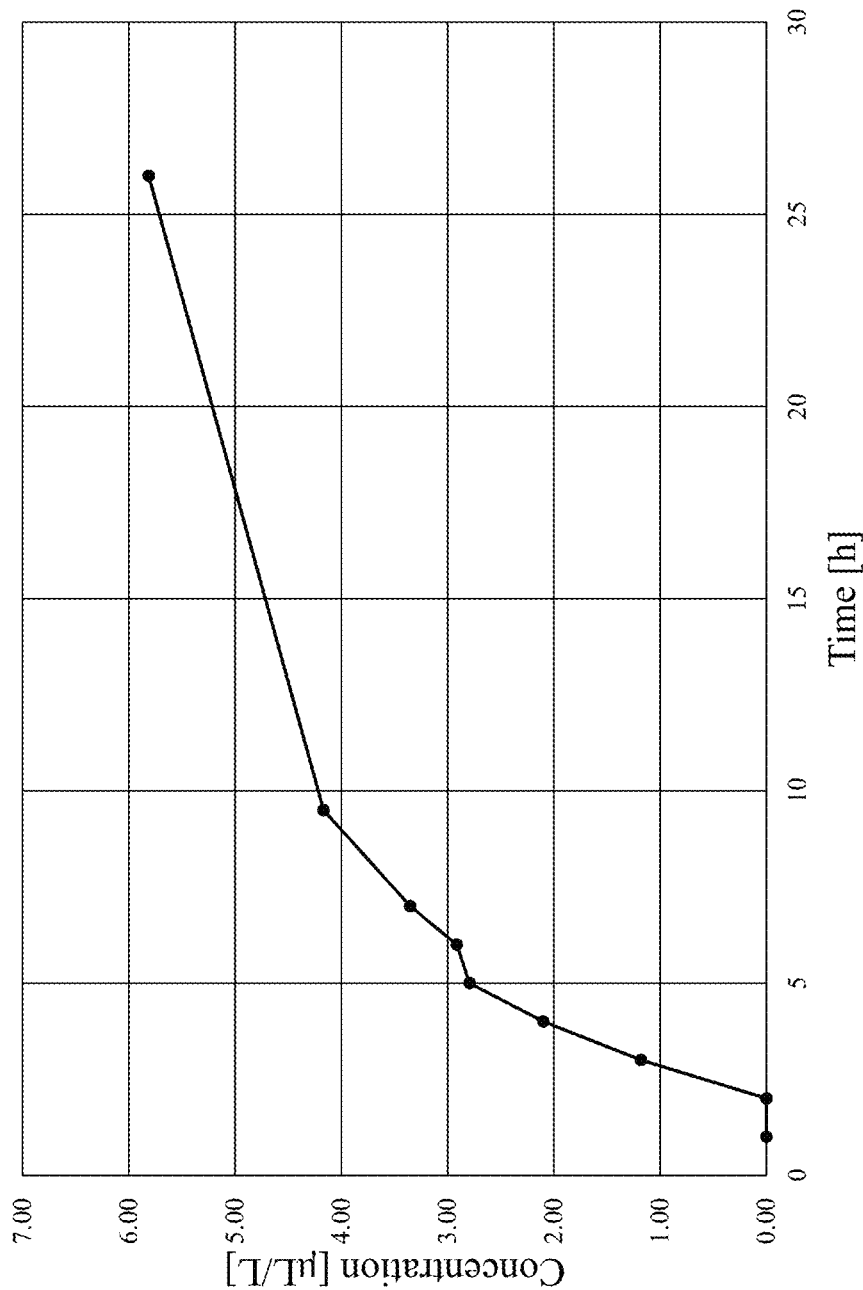
FIG. 16 is a graph showing concentration of 1-MCP released over time per $cm^2$ of Sample 1 of Example A-8 at 85% relative humidity.
Figure 17:
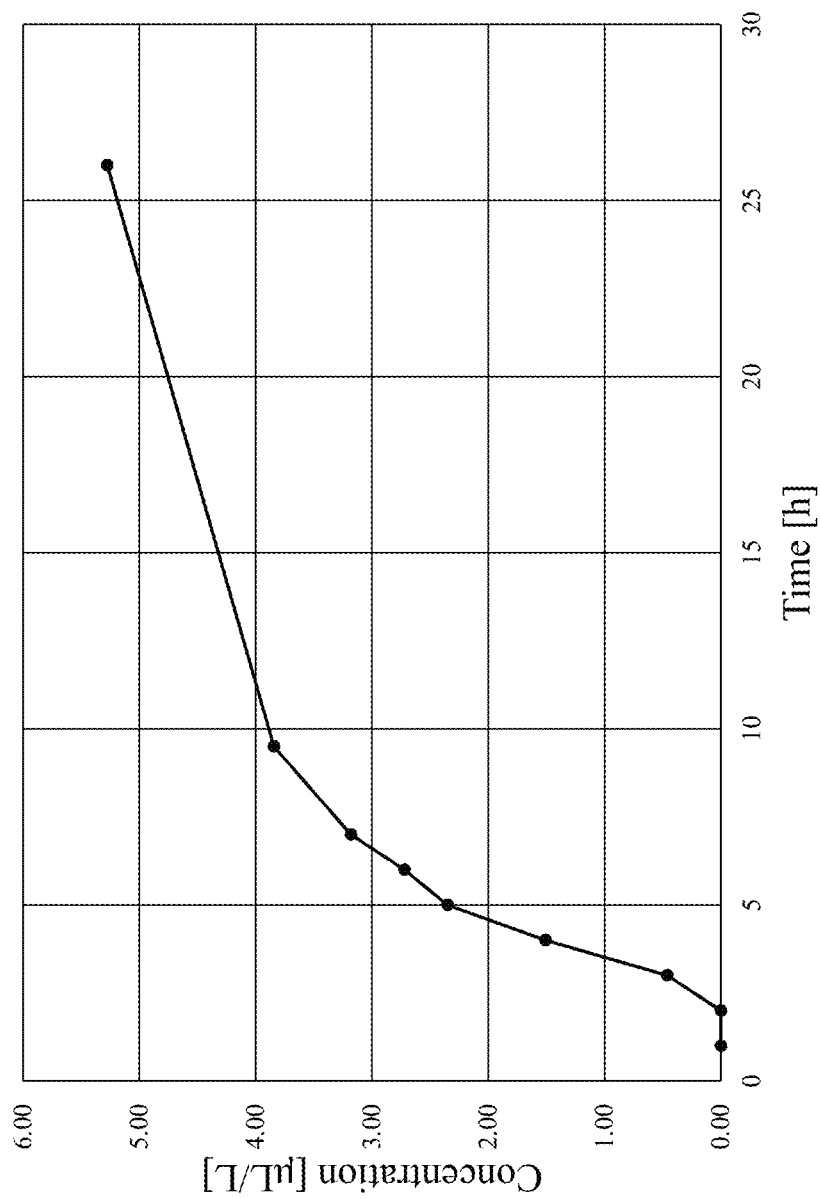
FIG. 17 is a graph showing concentration of 1-MCP released over time per cm² of Sample 2 of Example A-8 at 85% relative humidity.
Figure 18:
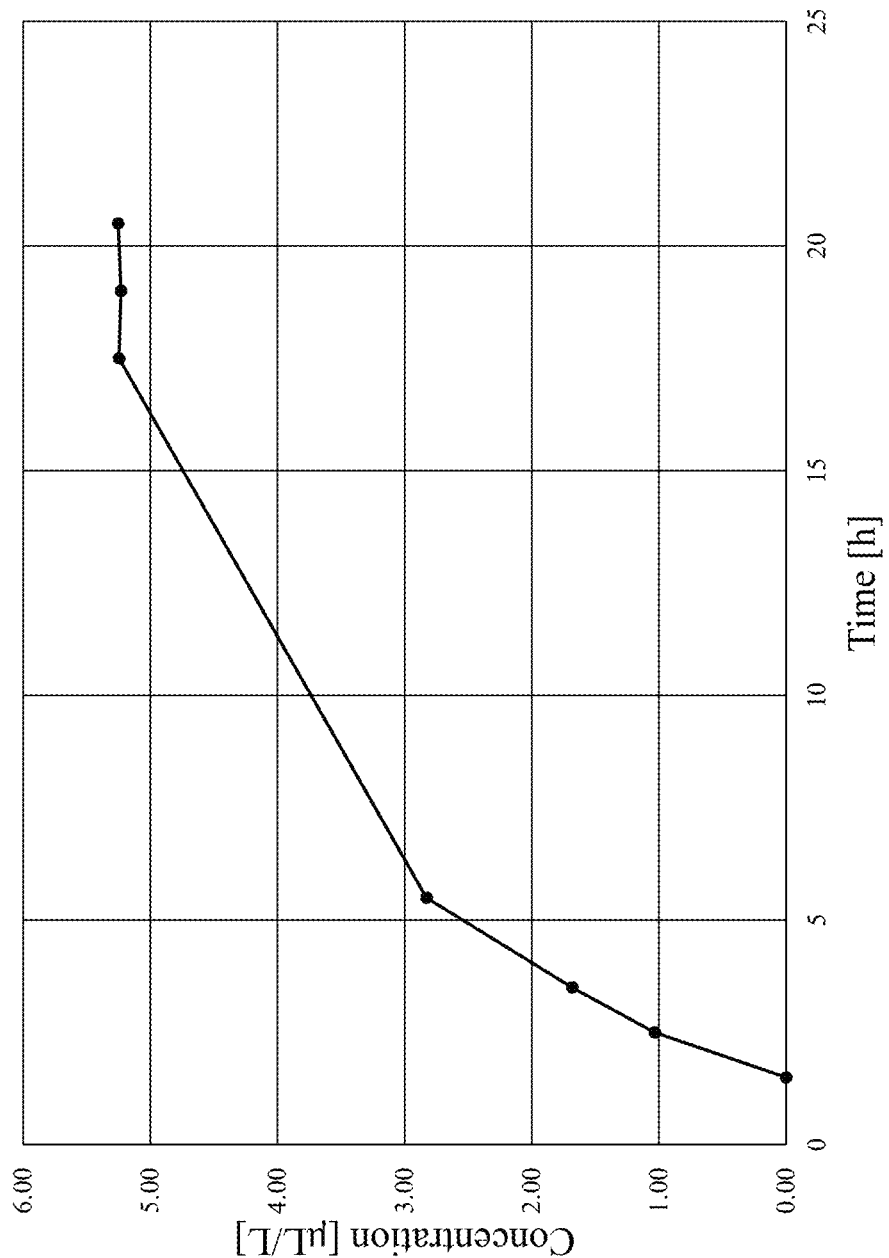
FIG. 18 is a graph showing concentration of 1-MCP released over time per cm² of Sample 3 of Example A-8 at 85% relative humidity.
Figure 19:
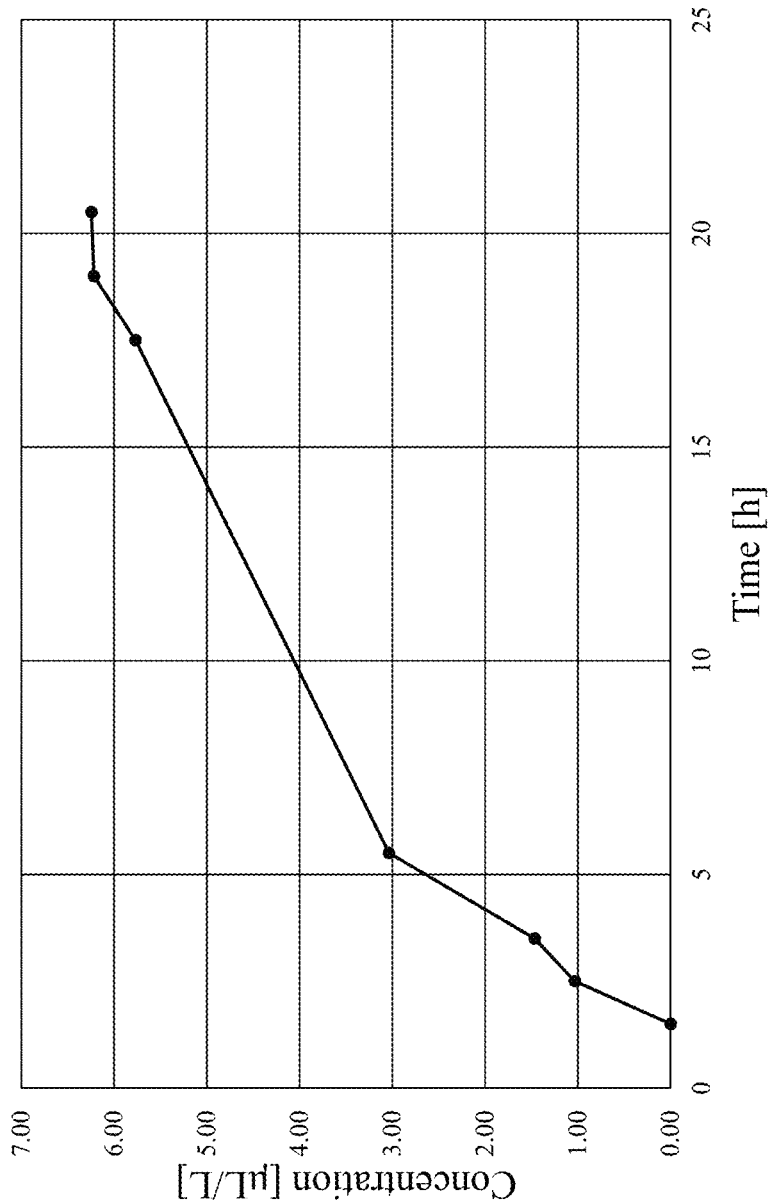
FIG. 19 is a graph showing concentration of 1-MCP released over time per cm² of Sample 4 of Example A-8 at 85% relative humidity.
Figure 20:
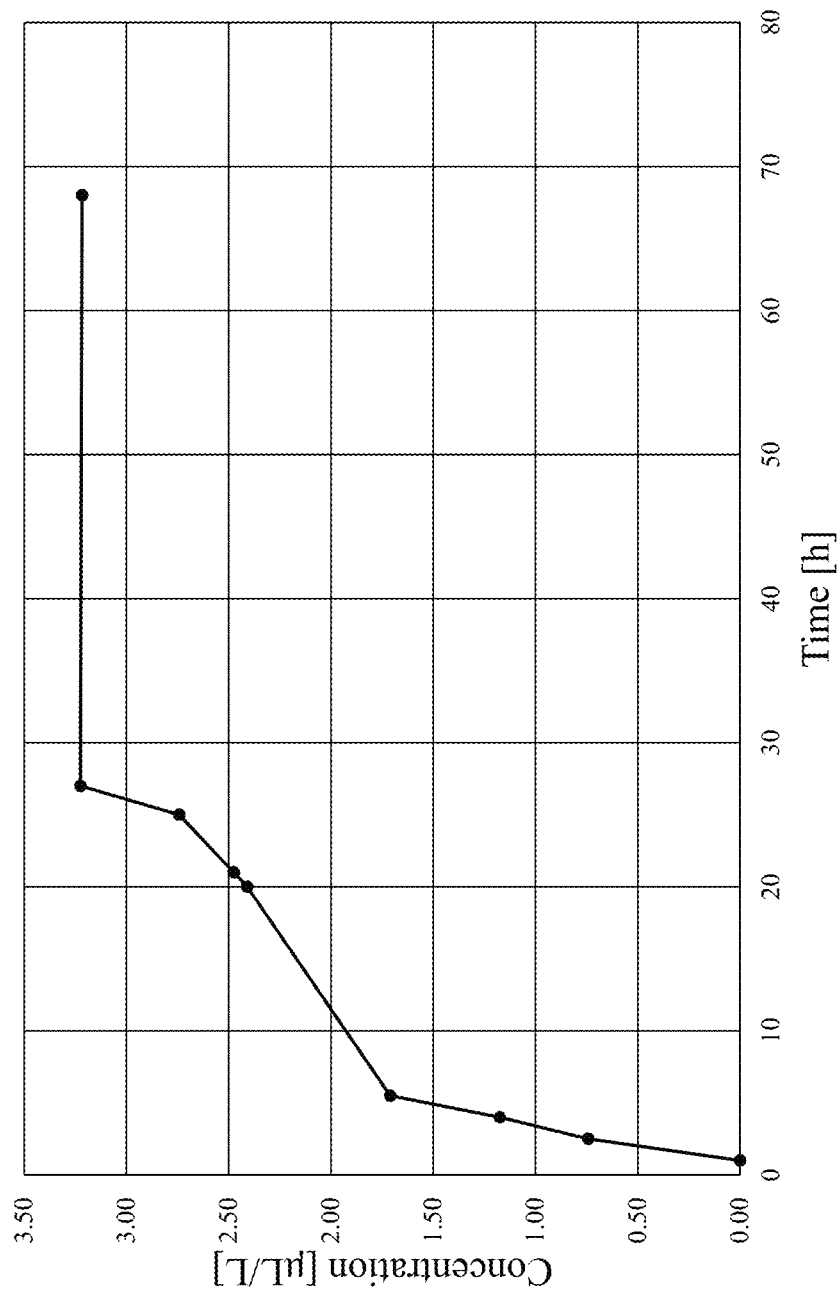
FIG. 20 is a graph showing concentration of 1-MCP released over time per cm² of Sample 5 of Example A-8 at 85% relative humidity.
Figure 21:
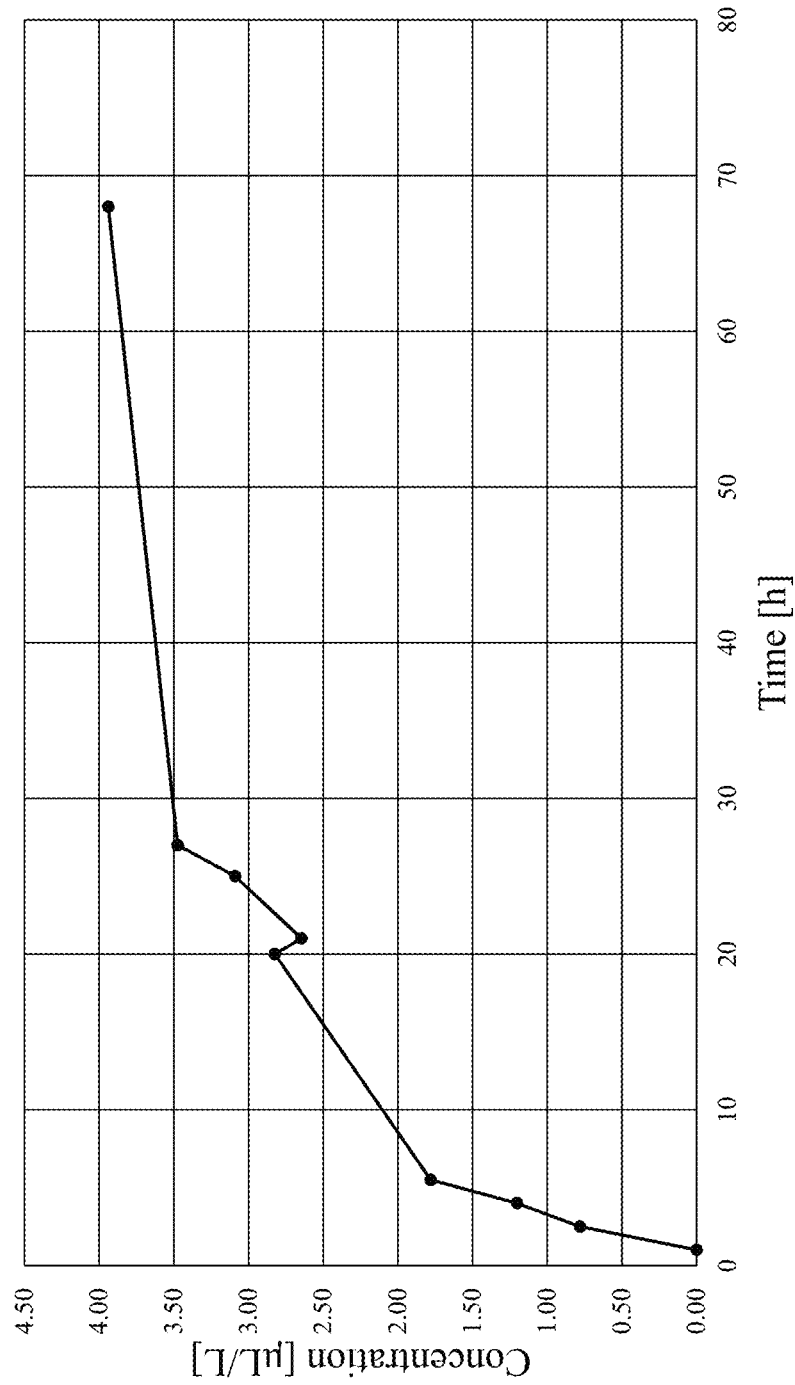
FIG. 21 is a graph showing concentration of 1-MCP released over time per cm² of Sample 6 of Example A-8 at 85% relative humidity.
Figure 22:
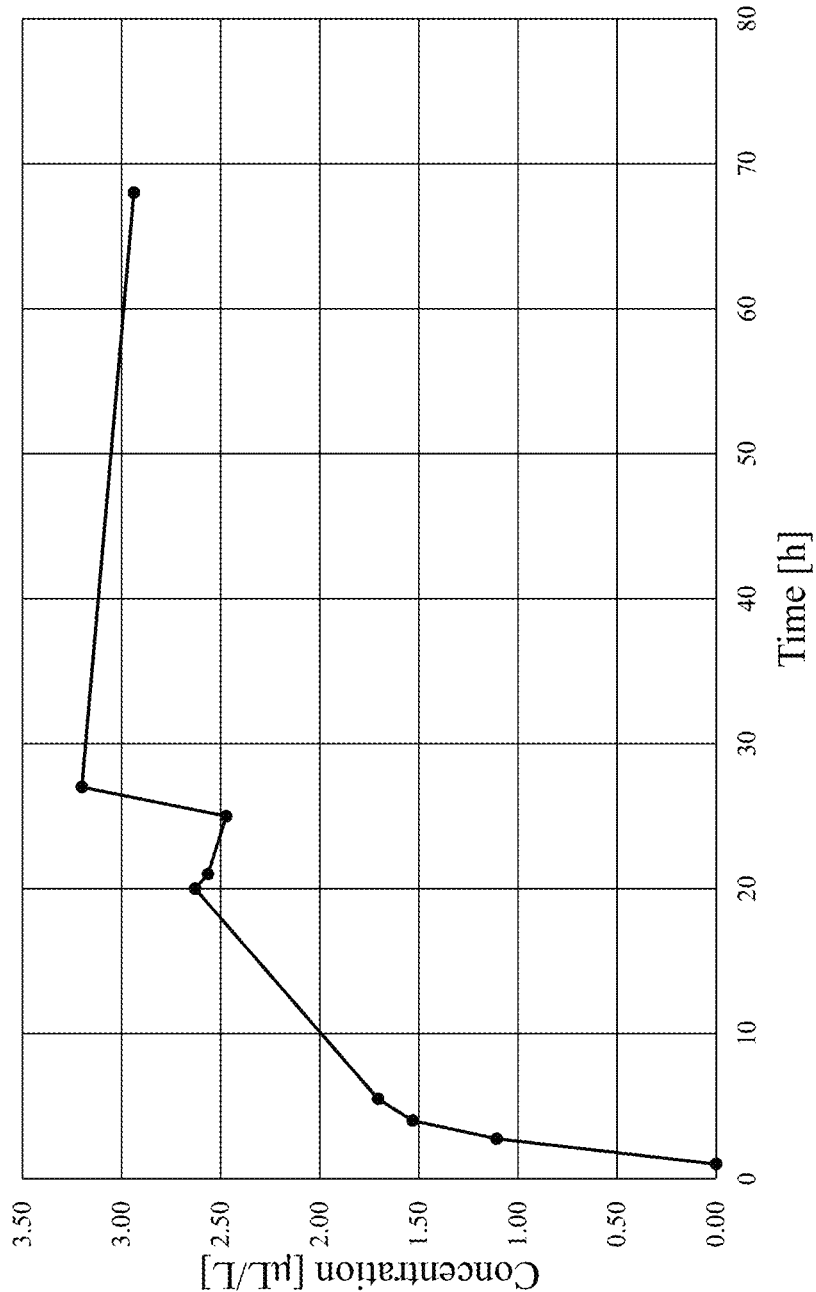
FIG. 22 is a graph showing concentration of 1-MCP released over time per cm² of Sample 7 of Example A-8 at 85% relative humidity.
Figure 23:
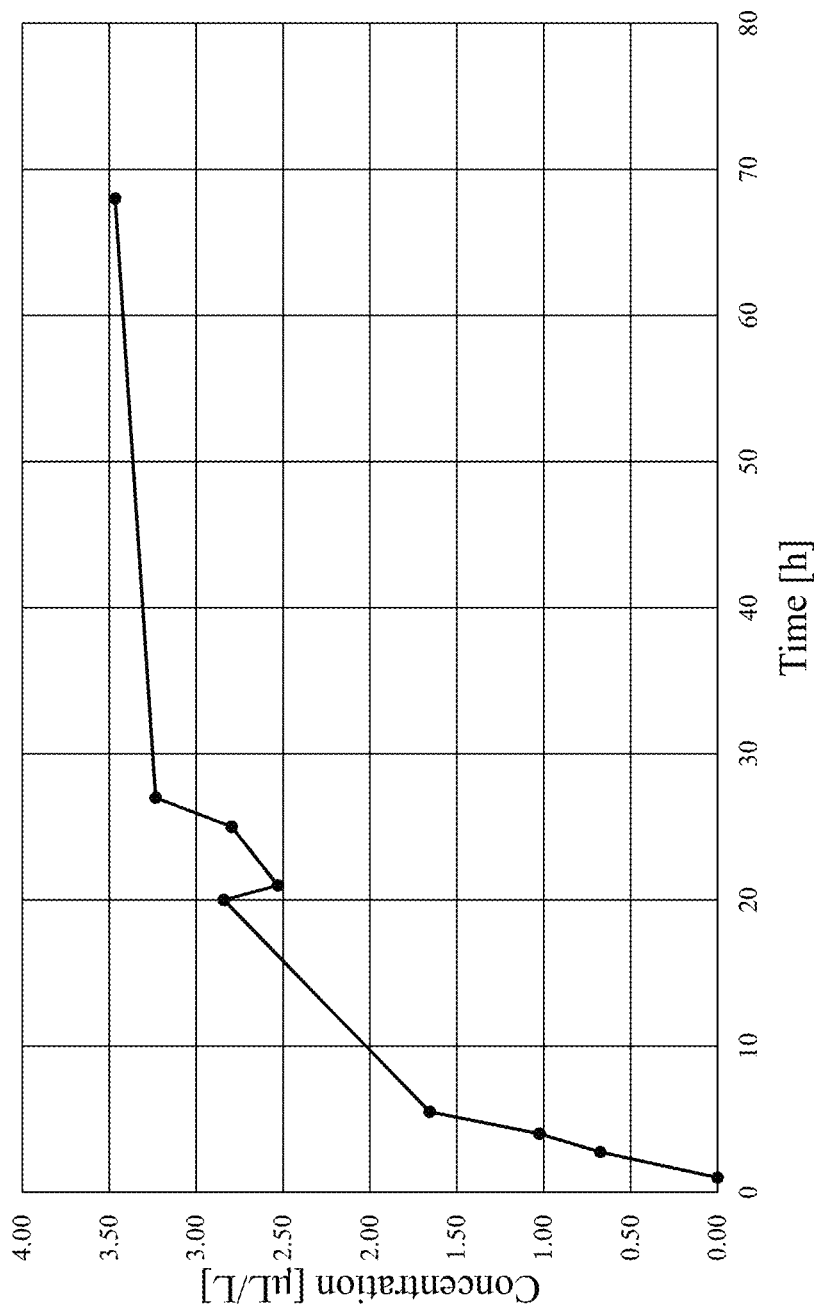
FIG. 23 is a graph showing concentration of 1-MCP released over time per cm² of Sample 8 of Example A-8 at 85% relative humidity.
Figure 24:
FIG. 24 is a graph showing concentration of 1-MCP released over time per cm² for a 5 cm² sample of Example A-8 at 85% relative humidity.
Figure 25:
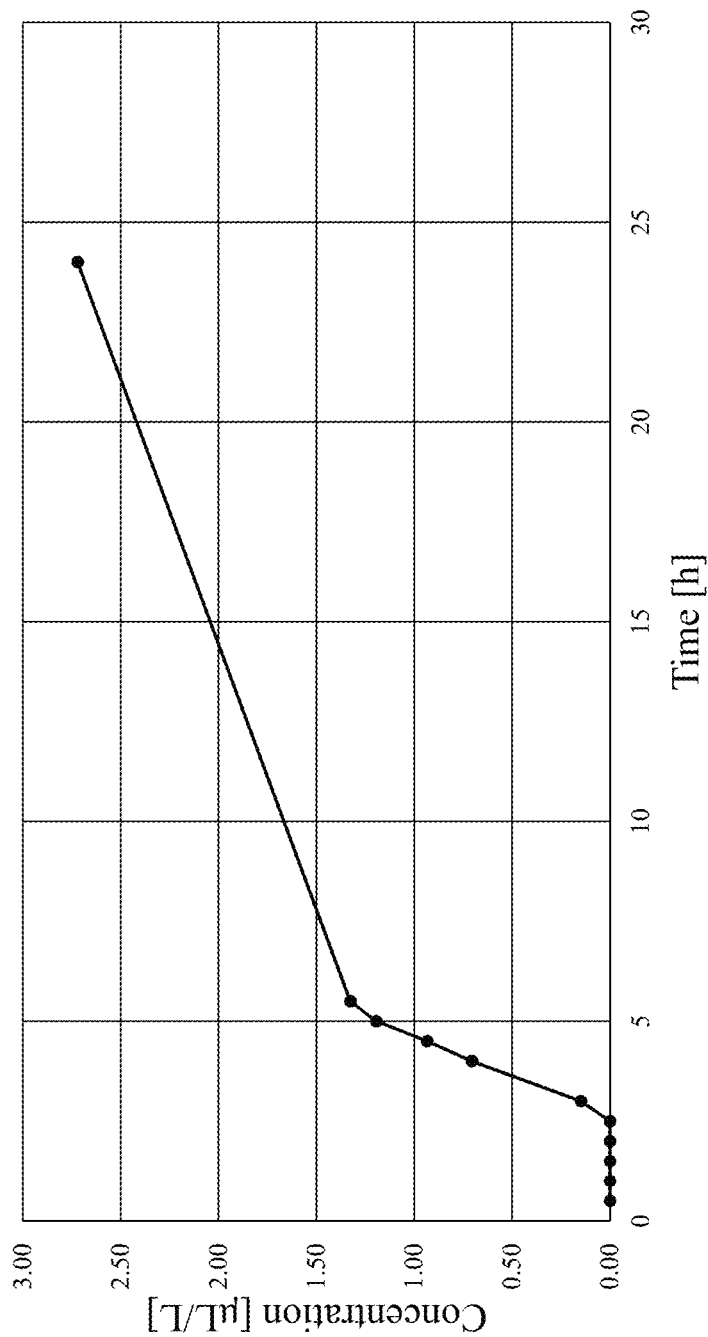
FIG. 25 is a graph showing concentration of 1-MCP released over time per cm² for a 10 cm² sample of Example A-8 at 85% relative humidity.
Figure 26:
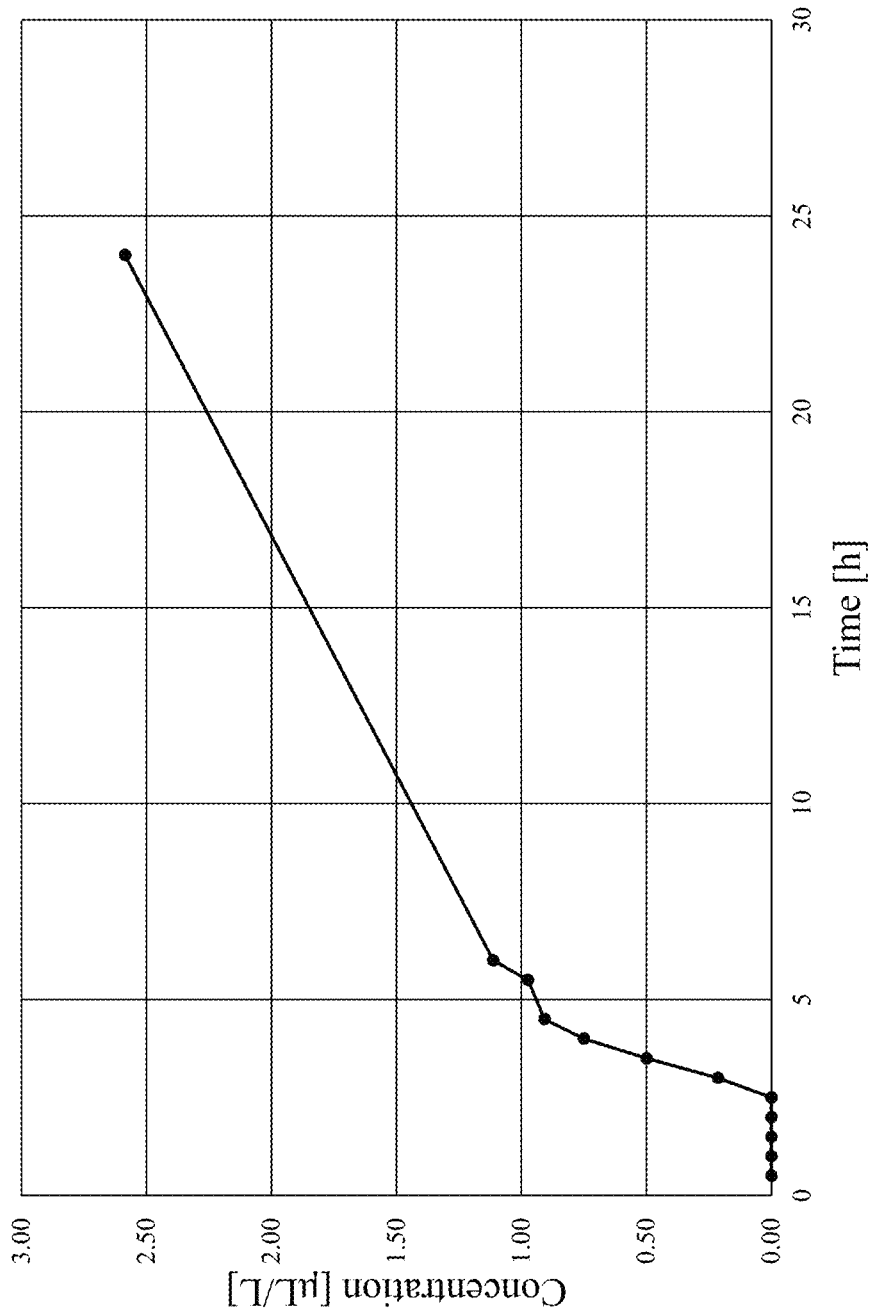
FIG. 26 is a graph showing concentration of 1-MCP released over time per cm² for a 20 cm² sample of Example A-8 at 85% relative humidity.
Figure 27:
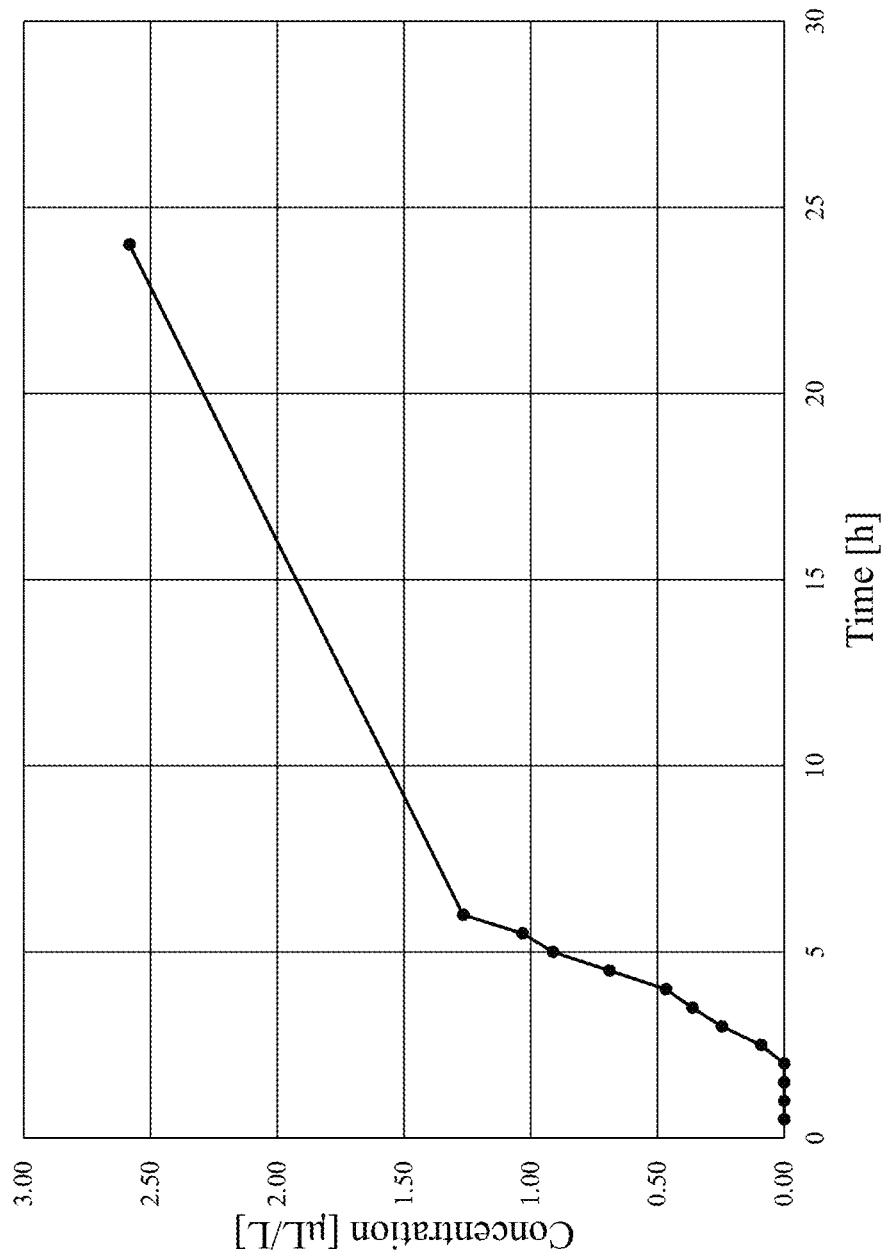
FIG. 27 is a graph showing concentration of 1-MCP released over time per cm² for a 40 cm² sample of Example A-8 at 85% relative humidity.
Figure 28:
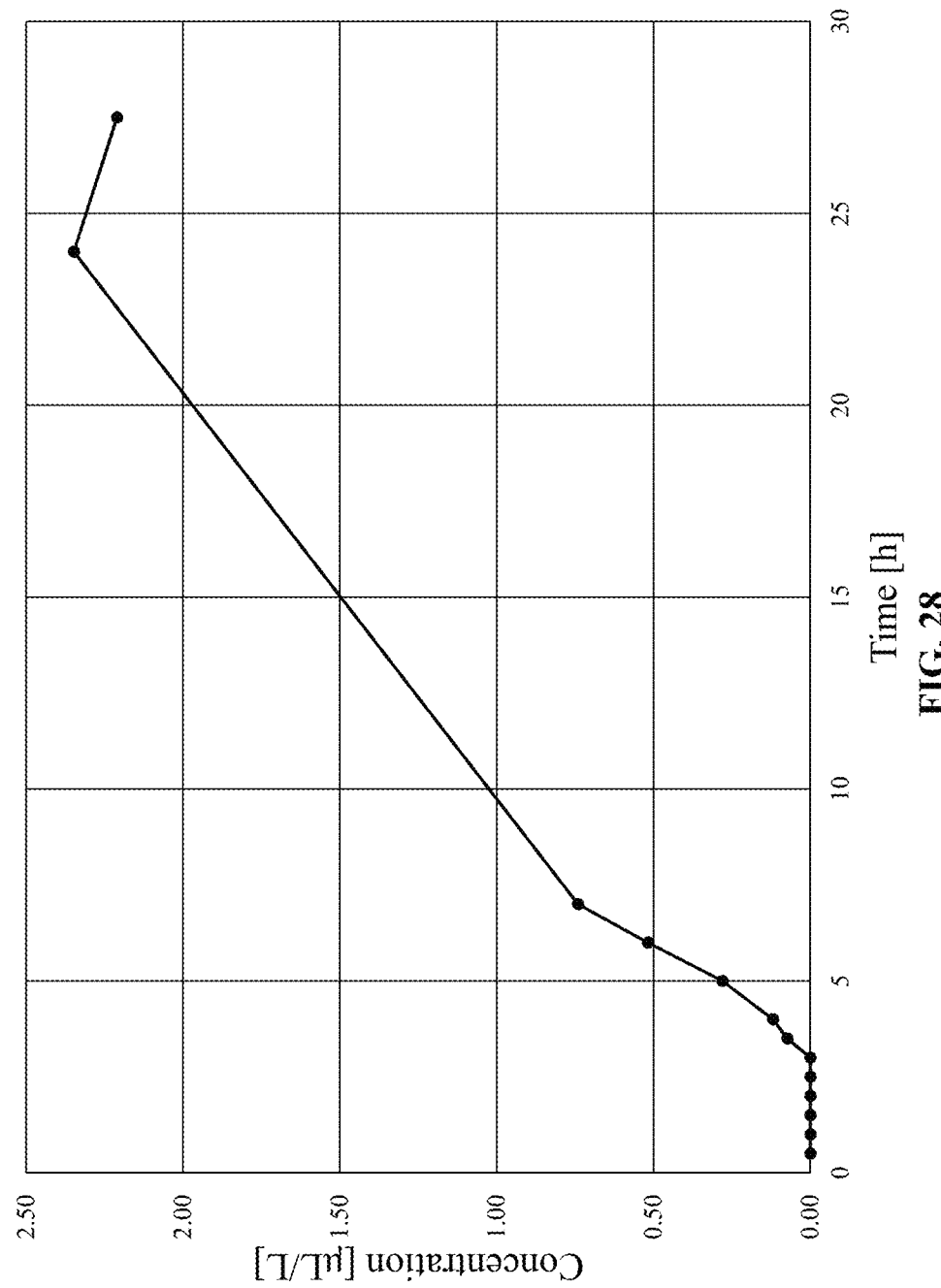
FIG. 28 is a graph showing concentration of 1-MCP released over time per cm² for Sample A, a 100 cm² sample, of Example A-8 at 85% relative humidity.
Figure 29:
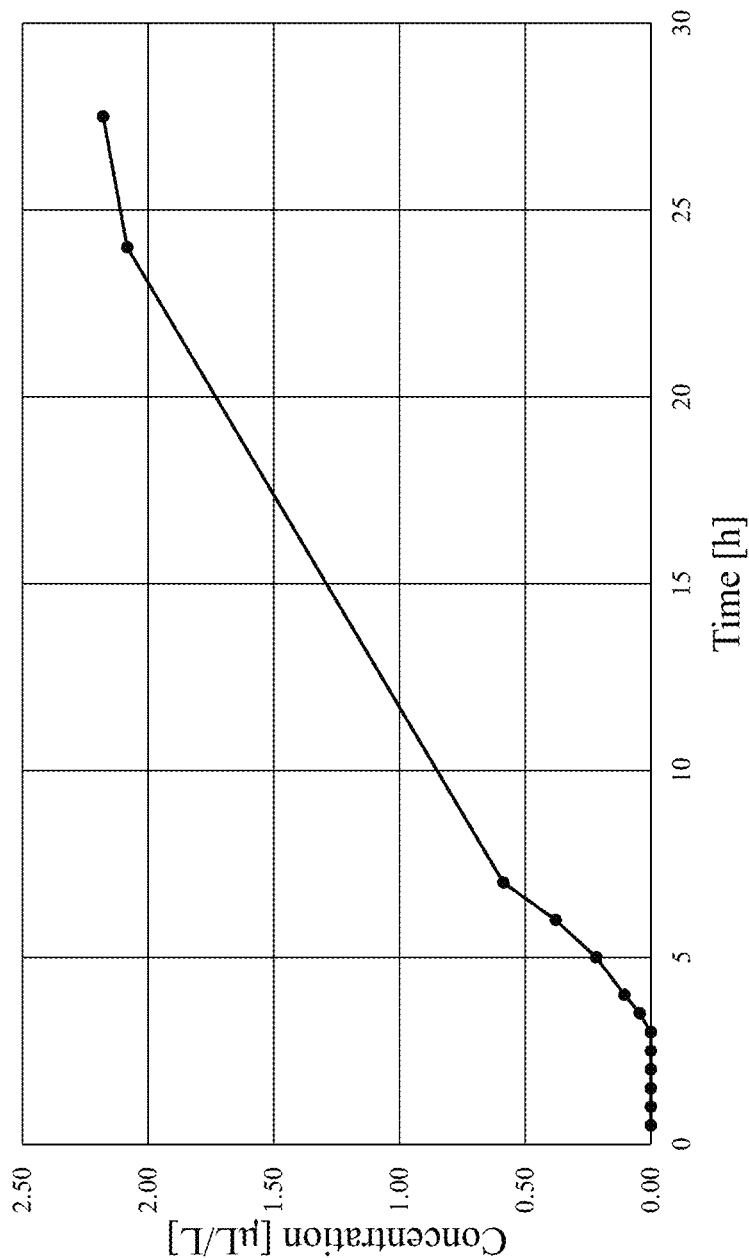
FIG. 29 is a graph showing concentration of 1-MCP released over time per cm² for Sample B, a 100 cm² sample, of Example A-8 at 85% relative humidity.

The analysis was performed on a gas chromatograph, testing the concentration of [μL/L] of 1-MCP released over time. The results are shown in FIGS. 4 and 5.

C. Packaging

Example 1

Film Production

25% by weight of a 1-methylcyclopropene/α-cyclodextrin complex with 3.3% 1-MCP was mixed with 75% by weight of ethylene vinyl acetate copolymer (Evatane® 28-03) and placed in a co-rotating twin screw extruder BTSK 20/40D with block heating to 80° C. The composite was extruded through a 3 mm diameter nozzle at a speed of 2 kg/h. The extruded composite was cooled with air and then granulated mechanically.

The content of 1-MCP was determined against a cis-2-butene standard using a gas chromatograph equipped with a flame ionization detector (FID) and a PoraBOND Q column: 25 m×0.25 mm (i.d.)×3 μm. The content of 1-MCP in the granulate was 0.42% by weight as calculated by the formula according to the CIPAC/4669/method.

The granulate composite prepared in this way was coextruded with PET granulate to form a three-layer film in the ABA format where each A layer is 10% and the B layer 80% of the finished film. The addition of 1-MCP containing granules to layer A is 1% by weight.

The co-extrusion process was carried out using a single-screw extruder at 260° C. to obtain a 0.5 mm thick film.

The co-extruded film was analyzed with respect to MCP content using a PoraBOND Q column: 25 m×0.25 mm (i.d.)×3 μm and a gas chromatograph coupled with a triple quadrupole mass spectrometer (Shimadzu, GCMS-TQ8040). The analysis was carried out at 120° C. in product ion scan mode, 120° C. dispenser temperature, 1:1 split, 55 cm/s carrier gas flow.

Figure 40:
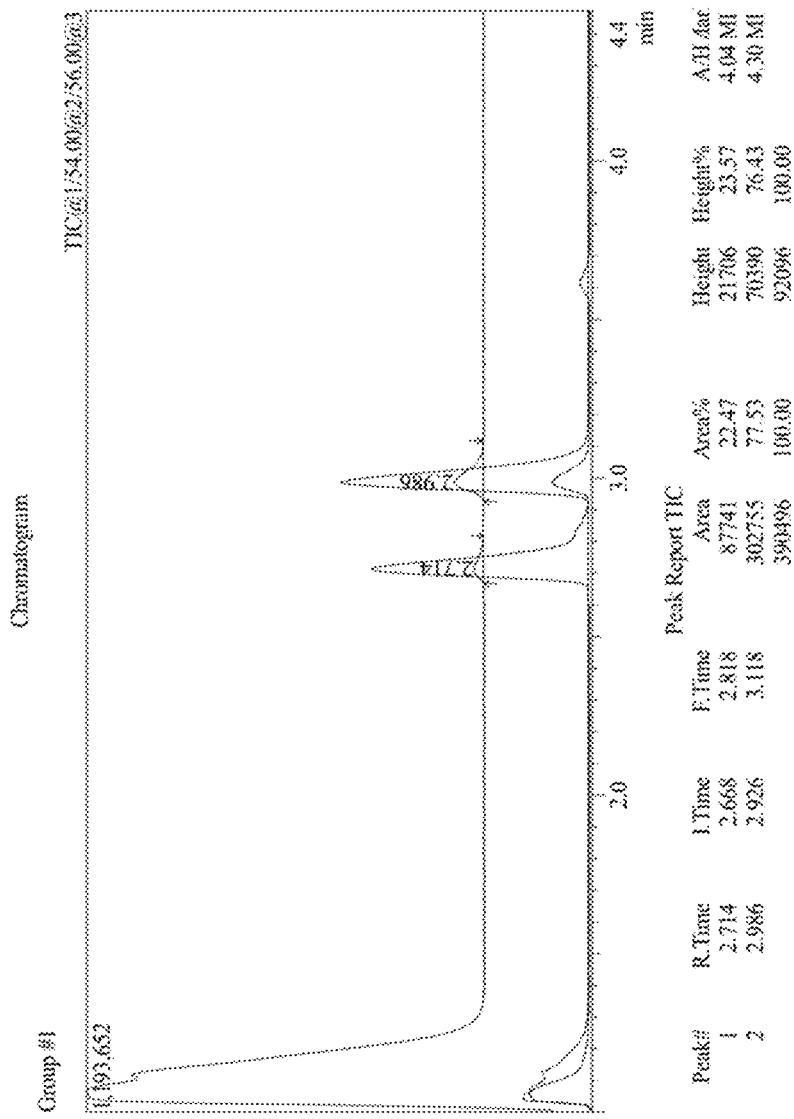
FIG. 40 shows the chromatogram of air from a film sample made by head technique space.
Figure 41:
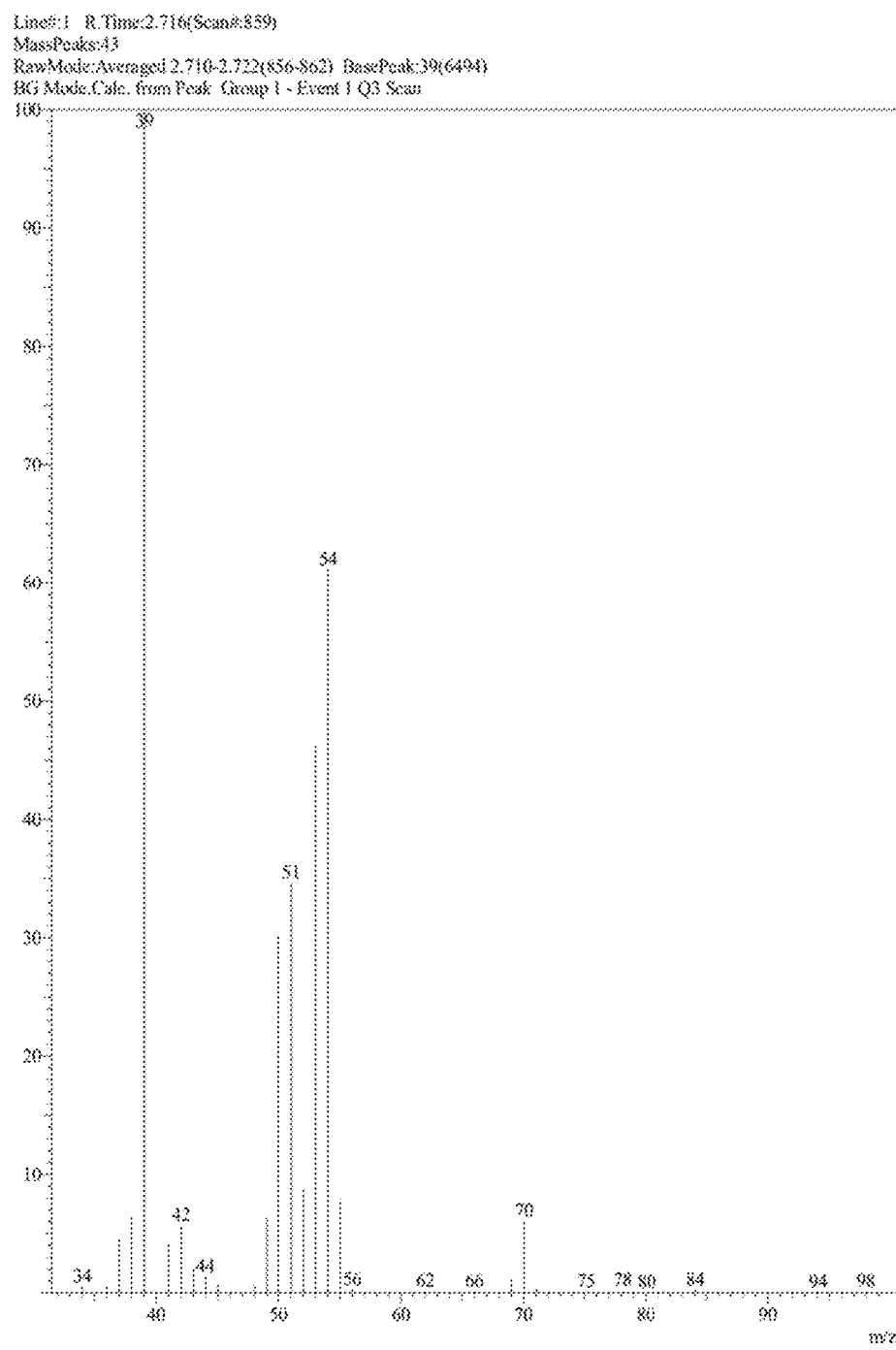
FIG. 41 shows the mass spectrum of 1-methylcyclopropene.
Figure 42:
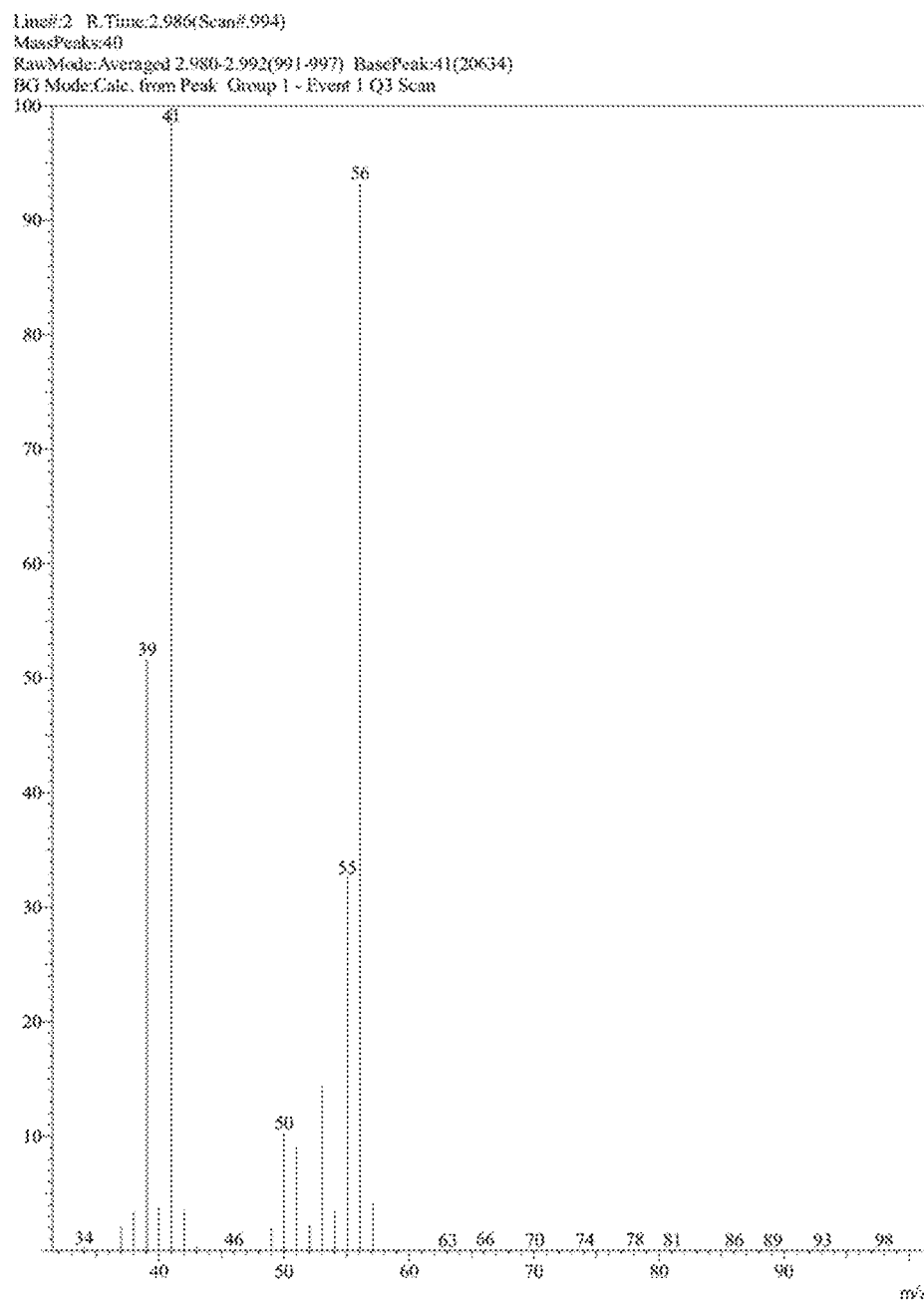
FIG. 42 shows the mass spectrum of cis-2-butene.

Analysis of the 1-MCP content in the film was done by crushing a sample of 100 $cm^2$ of film and then placing it in a gas-tight vial with a volume of 25 mL in 100% humidity, then a standard was added, which was 250 nL cis-2-butene. After two hours of incubation, the analysis was performed by injecting 250 μL of gas withdrawn from the vial. FIG. 40 is an exemplary chromatogram of the released 1-methylcyclopropene. FIGS. 41 and 42 are mass spectra of the released 1-MCP and cis-butene reference standard, respectively. The 1-MCP content calculated against the standard was 10.1 nL/L from 1 cm$^2$ of a 0.5 mm thick film.

A basket was made of the film prepared in this way, and the content of 1-MCP was determined after the thermoforming process.

A number of embodiments of the invention have been described. Nevertheless, it will be understood that various modifications may be made without departing from the spirit and scope of the invention. Accordingly, other embodiments are within the scope of the following claims.

What is claimed is:

1. A substrate comprising a surface comprising a composition,
    wherein the composition comprises:
        (i) a complex of 1-methylcyclopropene and α-cyclodextrin; and
        (ii) a polymer binder selected from the group consisting of polyvinylpyrrolidone and copolymers thereof, polyvinyl alcohol and copolymers thereof, polyvinyl acetate copolymers, and combinations thereof;
    wherein the ratio of polymer binder to complex on a weight to weight basis ranges from about 1:2 to about 4:1;
    wherein the polymer binder has a molecular weight ranging from about 5,000 to about 15,000; and
    wherein the composition is capable of releasing the 1-methylcyclopropene in the form of a gas when exposed to moisture.

2. The substrate of claim 1, wherein the substrate comprises a second surface comprising an adhesive.

3. The substrate of claim 1, wherein the ratio of polymer binder to complex on a weight to weight basis is from about 1:2 to about 3:1.

4. The substrate of claim 1, wherein the ratio of polymer binder to complex on a weight to weight basis is from about 1:2 to about 2:1.

5. The substrate of claim 1, wherein the ratio of polymer binder to complex on a weight to weight basis is about 1:1.

6. The substrate of claim 1, wherein the polymer binder has a molecular weight of about 10,000.

7. The substrate of claim 1, wherein the composition further comprises a hygroscopic agent.

8. The substrate of claim 7, wherein the hygroscopic agent is selected from the group consisting of glycerol, glucose, and combinations thereof.

9. The substrate of claim 1, wherein the composition further comprises a humidity-indicating dye.

10. The substrate of claim 1, wherein the substrate comprises a paper substrate.

11. The substrate of claim 1, wherein the substrate comprises a synthetic substrate.

12. The substrate of claim 1, wherein the 1-methylcyclopropene is present in the composition in an amount of from about 0.825 wt % to about 2.2 wt %.

13. The substrate of claim 1, wherein the composition has a release profile characterized in that when exposed at room temperature in a sealed vessel to conditions of 85% relative humidity, the composition releases substantially no 1-methylcyclopropene after a time period of at least 1 hour after exposure and thereafter continuously releases 1-methylcyclopropene for at least 5 hours after exposure.

14. The substrate of claim 1, wherein the composition has a release profile characterized in that when exposed at room temperature in a sealed vessel to conditions of 85% relative humidity, the composition releases substantially no 1-methylcyclopropene after 2 hours.

15. The substrate of claim 1, wherein the composition has a release profile characterized in that when exposed at room temperature in a sealed vessel to conditions of 85% relative humidity, the composition releases substantially no 1-methylcyclopropene after 3 hours.

16. The substrate of claim 1, wherein the composition has a release profile characterized in that when exposed at room temperature in a sealed vessel to conditions of 85% relative humidity, the composition releases substantially no 1-methylcyclopropene after a time period of at least 1 hour after exposure and thereafter continuously releases 1-methylcyclopropene for at least 24 hours after exposure.

17. The substrate of claim 1, wherein the composition has a release profile characterized in that when exposed at room temperature in a sealed vessel to conditions of 85% relative humidity, the composition releases substantially no 1-methylcyclopropene after a time period of at least 3 hours after exposure and thereafter continuously releases 1-methylcyclopropene for at least 24 hours after exposure.

18. The substrate of claim 1, wherein the composition has a release profile characterized in that when exposed in a sealed vessel to conditions of 80% relative humidity, the composition immediately releases 1-methylcyclopropene and thereafter continuously releases 1-methylcyclopropene for at least 96 hours after exposure.

19. The substrate of claim 1, wherein the wherein the 1-methylcyclopropene is present in the composition in an amount of from about 0.66 wt % to about 2.2 wt %.

20. The substrate of claim 1, wherein the substrate comprises a cardboard substrate.

* * * * *

UNITED STATES PATENT AND TRADEMARK OFFICE
CERTIFICATE OF CORRECTION

| | | |
|---|---|---|
| PATENT NO. | : 12,043,733 B2 | Page 1 of 1 |
| APPLICATION NO. | : 17/567599 | |
| DATED | : July 23, 2024 | |
| INVENTOR(S) | : Andrzej Wolan et al. | |

It is certified that error appears in the above-identified patent and that said Letters Patent is hereby corrected as shown below:

On the Title Page

In Column 2, (other publications) Line 5, delete "28(1):1- 25." and insert --28(1):1-25.--.

In the Claims

Column 18, Line 45, Claim 19, delete "wherein the wherein the" and insert --wherein the--.

Signed and Sealed this
Twelfth Day of November, 2024

Katherine Kelly Vidal
Director of the United States Patent and Trademark Office